US008631137B2

(12) United States Patent
Douillet et al.

(10) Patent No.: US 8,631,137 B2
(45) Date of Patent: Jan. 14, 2014

(54) BRIDGE BETWEEN DIGITAL LIVING NETWORK ALLIANCE (DLNA) PROTOCOL AND WEB PROTOCOL

(75) Inventors: Ludovic Douillet, Escondido, CA (US); Ted Dunn, Carlsbad, CA (US); David Tao, San Diego, CA (US)

(73) Assignees: Sony Corporation, Tokyo (JP); Sony Corporation Inc., Park Ridge, NJ (US)

( * ) Notice: Subject to any disclaimer, the term of this patent is extended or adjusted under 35 U.S.C. 154(b) by 592 days.

(21) Appl. No.: 12/215,630

(22) Filed: Jun. 27, 2008

(65) Prior Publication Data

US 2009/0327507 A1 Dec. 31, 2009

(51) Int. Cl.
*G06F 15/16* (2006.01)
(52) U.S. Cl.
USPC .......................................... 709/228; 709/246
(58) Field of Classification Search
USPC .................................. 709/228, 246
See application file for complete search history.

(56) References Cited

U.S. PATENT DOCUMENTS

| 7,809,742 | B2 | 10/2010 | Kagaya |
| 2002/0000998 | A1 | 1/2002 | Scott et al. |
| 2003/0033434 | A1* | 2/2003 | Kavacheri et al. ............ 709/246 |
| 2004/0143598 | A1 | 7/2004 | Drucker et al. |
| 2004/0162845 | A1 | 8/2004 | Kim et al. |
| 2004/0189707 | A1 | 9/2004 | Moore et al. |
| 2005/0010565 | A1 | 1/2005 | Cushing et al. |
| 2005/0210119 | A1* | 9/2005 | Kumar ........................... 709/217 |
| 2006/0020589 | A1* | 1/2006 | Wu et al. ........................... 707/3 |
| 2006/0020969 | A1 | 1/2006 | Utsuki et al. |
| 2006/0026523 | A1 | 2/2006 | Kitamaru et al. |
| 2006/0075015 | A1* | 4/2006 | Wu et al. ....................... 709/202 |
| 2006/0161635 | A1 | 7/2006 | Lamkin et al. |
| 2006/0168126 | A1* | 7/2006 | Costa-Requena et al. ..... 709/219 |
| 2006/0195553 | A1 | 8/2006 | Nakamura |
| 2006/0280449 | A1 | 12/2006 | Ogawa et al. |
| 2007/0006268 | A1* | 1/2007 | Mandera et al. ................ 725/80 |
| 2007/0027855 | A1 | 2/2007 | Kagawa |
| 2007/0061748 | A1 | 3/2007 | Hirose |
| 2007/0061757 | A1 | 3/2007 | Kobayashi |
| 2007/0078959 | A1* | 4/2007 | Ye ................................. 709/223 |

(Continued)

FOREIGN PATENT DOCUMENTS

EP 1 845 683 A1 10/2007
WO WO 2006/066052 A2 6/2006

OTHER PUBLICATIONS

"HTTP Made Really Easy, A Practical Guide to Writing Clients and Servers," James Marshall, jwmarshall.com, Aug. 15, 1997.

(Continued)

*Primary Examiner* — Duyen Doan
(74) *Attorney, Agent, or Firm* — Miller Patent Services; Jerry A. Miller

(57) ABSTRACT

A web protocol request is received from a web-based device for aggregated A/V content information associated with A/V content stored within the DLNA home network. The web protocol request is converted to one or more DLNA search messages each associated with one or more active DLNA servers. A/V content information associated with each of the one or more active DLNA servers is aggregated using the one or more DLNA search messages. The aggregated A/V content information is formatted into a web protocol response. The web protocol response is sent to the web-based device. This abstract is not to be considered limiting, since other embodiments may deviate from the features described in this abstract.

18 Claims, 15 Drawing Sheets

(56) References Cited

U.S. PATENT DOCUMENTS

| | | | |
|---|---|---|---|
| 2007/0106949 A1 | 5/2007 | Narita et al. | |
| 2007/0143264 A1 | 6/2007 | Szeto | |
| 2007/0143377 A1* | 6/2007 | Waites | 707/205 |
| 2007/0143687 A1 | 6/2007 | Choi et al. | |
| 2007/0150828 A1 | 6/2007 | Tsukada et al. | |
| 2007/0208718 A1 | 9/2007 | Javid et al. | |
| 2007/0211728 A1 | 9/2007 | Kim et al. | |
| 2007/0220114 A1* | 9/2007 | Kaarela et al. | 709/219 |
| 2007/0220563 A1* | 9/2007 | Wu | 725/81 |
| 2007/0237090 A1 | 10/2007 | Kim et al. | |
| 2007/0237115 A1* | 10/2007 | Bae et al. | 370/331 |
| 2007/0239668 A1* | 10/2007 | Shin et al. | 707/2 |
| 2007/0250870 A1 | 10/2007 | Kim et al. | |
| 2007/0264975 A1* | 11/2007 | Bae et al. | 455/412.1 |
| 2008/0016177 A1 | 1/2008 | Jin et al. | |
| 2008/0021929 A1 | 1/2008 | Fujiwara | |
| 2008/0028308 A1 | 1/2008 | Brownlee et al. | |
| 2008/0154880 A1* | 6/2008 | Hsu | 707/5 |
| 2008/0216129 A1 | 9/2008 | Chaney | |
| 2008/0233983 A1* | 9/2008 | Park et al. | 455/466 |
| 2008/0235358 A1* | 9/2008 | Moribe et al. | 709/220 |
| 2008/0244406 A1 | 10/2008 | Ikehata | |
| 2008/0270949 A1 | 10/2008 | Liang | |
| 2008/0288440 A1* | 11/2008 | Monni | 707/1 |
| 2008/0310763 A1 | 12/2008 | Senoo | |
| 2009/0007014 A1 | 1/2009 | Coomer et al. | |
| 2009/0019031 A1 | 1/2009 | Krovitz et al. | |
| 2009/0064029 A1 | 3/2009 | Corkran et al. | |
| 2009/0083029 A1 | 3/2009 | Doi et al. | |
| 2009/0248702 A1 | 10/2009 | Schwartz et al. | |
| 2009/0268754 A1* | 10/2009 | Palm et al. | 370/466 |

OTHER PUBLICATIONS

"Content Directory: 1 Service Template Version 1.01," Contributing members of the UPnP Forum, Jun. 25, 2002.

"MediaServer: 1 Device Template Version 1.01," Contributing members of the UPnP Forum, Jun. 25, 2002.

"UPnP Device Architecture 1.0," Version 1.0.1, Contributing members of the UPnP Forum, Dec. 2003.

"Digital Living Network Alliance, Sharing Digital Content Throughout the Networked Home," Patrick Griffis, May 10, 2005.

"Networked Digital Media Standards, A UPnP/DLNA Overview," Allegro Software Development Corporation, Oct. 26, 2006.

"A System Architecture for Ambient Intelligent Environments," Christopher Baker, Electrical Engineering and Computer Sciences, University of California at Berkeley, Dec. 15, 2006.

"Home Entertainment Automation Using UPnP AV Architecture and Technology," Edward F. Steinfeld, date unknown.

"UPnP Control Point for Mobile Phones in Residential Networks," Andreas Haber, Frank Reichert, and Andreas Fasbender, date unknown.

"Using Pen and Paper to Control Networked Appliances," Mario Kolberg and Evan H. Magill, Department of Computing Science and Mathematics, University of Stirling, UK, date unknown.

"The MediaNet Reference Architecture and Common Interfaces (mid-term version)," Multimedia Networking IST-Project: FP6-507452, MediaNet, date unknown.

"User Created Content in the Extended Home," Petros Belimpasakis, and Rod Walsh, Nokia Research Center, date unknown.

USPTO, Office Action for U.S. Appl. No. 12/215,500, pp. 1-17, Oct. 26, 2010.

Non-Final Office Action, U.S. Appl. No. 12/215,478 dated Jun. 24, 2011.

Final Office Action, U.S. Appl. No. 12/215,500 dated Mar. 23, 2011.

\* cited by examiner

BRIDGE BETWEEN DIGITAL LIVING NETWORK ALLIANCE (DLNA) PROTOCOL AND WEB PROTOCOL

CROSS REFERENCE TO RELATED DOCUMENTS

This application is related to the application titled "AGGREGATING CONTENTS LOCATED ON DIGITAL LIVING NETWORK ALLIANCE (DLNA) SERVERS ON A HOME NETWORK," filed contemporaneously herewith on Jun. 27, 2008 and assigned application Ser. No. 12/215,500, and to the application titled "USER INTERFACE TO DISPLAY AGGREGATED DIGITAL LIVING NETWORK ALLIANCE (DLNA) CONTENT ON MULTIPLE SERVERS," filed contemporaneously herewith on Jun. 27, 2008 and assigned application Ser. No. 12/215,478, which are both hereby incorporated by reference as if fully set forth herein. The documents titled "ContentDirectory:1 Service Template Version 1.01," by the UPnP™ Forum, dated Jun. 25, 2002, "MediaServer:1 Device Template Version 1.01," by the UPnP™ Forum, dated Jun. 25, 2002, and "UPnP™ Device Architecture 1.0, Version 1.0.1," by the UPnP™ Forum, dated Dec. 2, 2003 are incorporated in their entireties by reference as if fully set forth here.

BACKGROUND

Home networking refers to systems that allow users of computing devices, audio devices, and video devices to network the devices within their homes. The Digital Living Network Alliance (DLNA) was formed in recent years to generate standards for interaction and communication protocol usage between devices networked within a home environment.

Devices that store audio and video content within a DLNA-compliant home network are known as DLNA servers. Devices that are capable of accessing and rendering content stored on DLNA servers are known as DLNA clients. DLNA clients typically take the form of audio or video players. Users of conventional DLNA client devices access each DLNA server independently to determine what content is available on the respective DLNA server. User interfaces associated with conventional DLNA client devices provide a directory hierarchy representation of each DLNA server and the user independently accesses and traverses each directory component to determine what content is available on the respective DLNA server. Additionally, web and DLNA protocols are incompatible protocols. Accordingly, conventional web-based applications cannot access the audio and video content stored on DLNA servers within a DLNA network.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
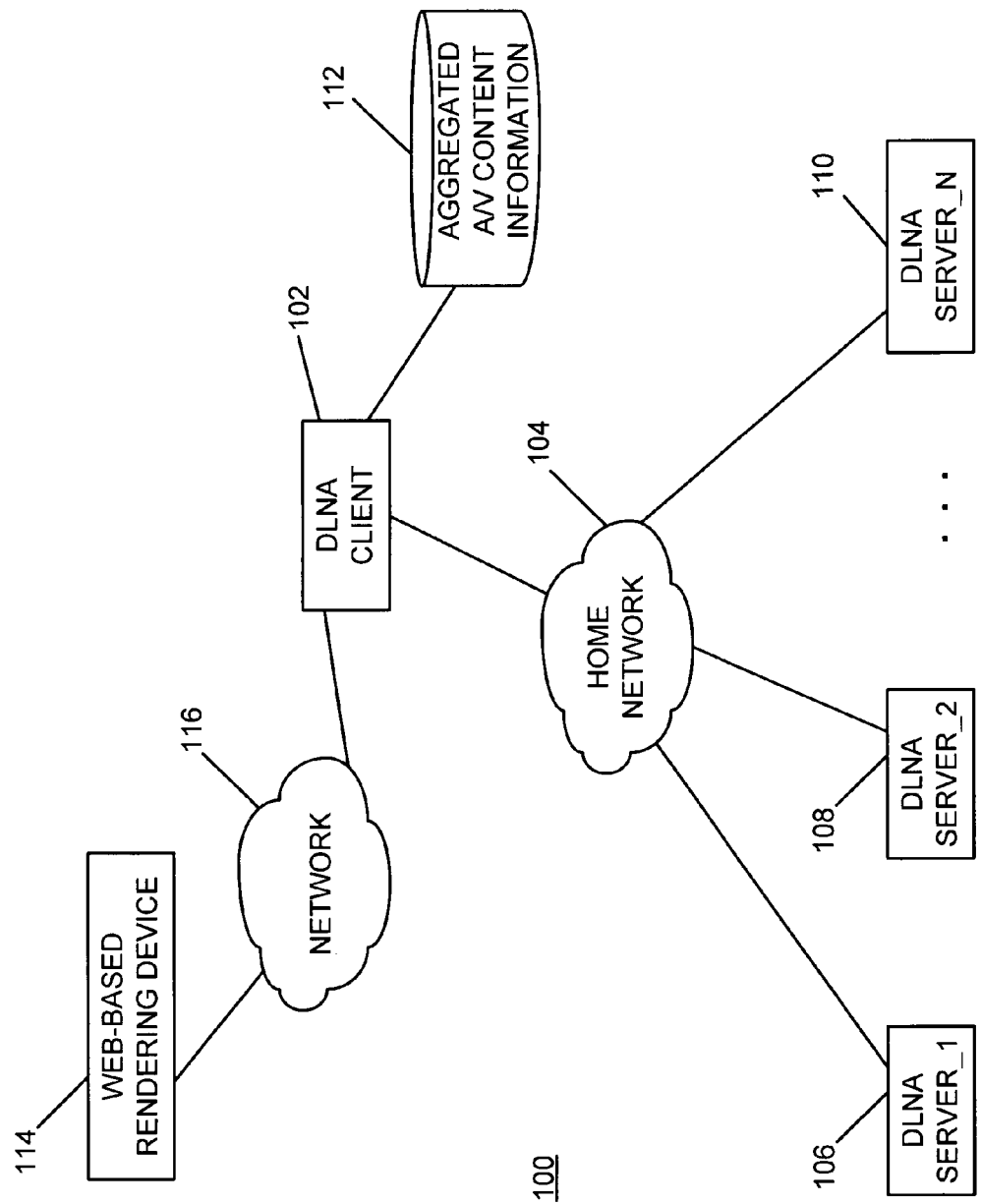
FIG. 1 is a block diagram of an example of an implementation of a system that provides automated aggregation and filtering of audio and video (A/V) content information representing available A/V content within a home network environment consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system having one or more processors.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The present subject matter provides automated aggregation and filtering of audio and video (A/V) content information representing available A/V content located on multiple Digital Living Network Alliance (DLNA) servers within a home network environment. A DLNA client automatically aggregates the A/V content information when it enters the network, when DLNA servers enter the network, and when A/V content changes within any DLNA server on the network. The DLNA client filters the A/V content information in response to user queries for A/V content based upon A/V filter criteria, such as category, genre, title, runtime, date, or other filtering criteria. Additionally, the aggregated A/V content information may be presented as a pool of images, such as thumbnails, and categorized by alternative filtering criteria, such as movies, sports, or news, for selection by the user. As another alternative, the DLNA client automatically aggregates the A/V content by querying each DLNA server with a DLNA filtered search in response to the user query. The DLNA client presents a non-hierarchical pool of A/V identifier elements, such as thumbnail images or uniform resource identifiers (URIs), to a user. Each of the A/V identifier elements form a portion of and represent one item of filtered and aggregated A/V content information. As such, a user may select an A/V identifier element to access the associated A/V content for rendering without separately accessing or navigating a directory hierarchy for each DLNA server. Upon selection of the respective A/V identifier element, the associated URI is accessed to render the associated A/V content. The aggregated and filtered non-hierarchical pool of A/V identifier elements may be organized, categorized, and grouped in a variety of ways to facilitate increased A/V content navigational opportunities. Furthermore, a bridge component provides translation between web protocols and the DLNA protocol to allow web-based applications outside of the home network to access the aggregated A/V content information for filtering and rendering via the web-based applications.

Turning now to FIG. 1, a block diagram of an example of an implementation of a system 100 is shown that provides automated aggregation and filtering of audio and video (A/V) content information representing available A/V content within a home network environment. A DLNA client 102 interconnects via a network 104 with a DLNA server_1 106, a DLNA server_2 108, through a DLNA server_N 110. As will be described in more detail below, the DLNA client 102 provides automated aggregation and filtering of available A/V content information located on the server_1 106, the DLNA server_2 108, through the DLNA server_N 110. This automated aggregation and filtering may be performed in response to user queries and may be performed in a scheduled manner. An aggregated A/V content information database 112 provides storage for aggregated A/V content information obtained from the server_1 106 through the DLNA server_N 110.

For purposes of the present description, example aggregation and filtering queries generated by a user may include category, genre, title, runtime, date, or other filtering criteria. For example, a query may include a category for A/V content of movie and a genre of "western". Additional example filtering criteria include a production date range, an actor name, a producer name, and a country of production. Many other aggregation and filtering criteria are possible and all are considered within the scope of the present subject matter.

Additionally, queries may be generated by a user of the DLNA client 102 or of a device in communication with the DLNA client 102 and the results of the queries may be presented or rendered on the respective client device. Example client devices include a personal digital assistant (PDA), mobile phone, or other mobile device (none shown). Alternatively, the results of the queries may be rendered on any other device associated with the home network 104.

At least two example modes of operation will be described for the DLNA client 102. In a first example mode of operation, the DLNA client 102 reduces filtering response time by aggregating information associated with available A/V content located on each of the DLNA server_1 106 through the DLNA server_N 110 in advance of user queries for available A/V content. In this example mode of operation, the DLNA client 102 filters the previously aggregated A/V content information in response to a user query and presents the filtered A/V content information within a flat non-hierarchical representation that allows the user to more readily select A/V content for rendering without the need for engaging in the tedious process of separately accessing or navigating a separate directory hierarchy for each DLNA server.

In a second example mode of operation, the DLNA client 102 reduces local A/V content information storage resources by aggregating available A/V content in real time in response to user queries. For purposes of the present description, the term "real time" shall include what is commonly termed "near real time"—generally meaning any time frame of sufficiently short duration as to provide reasonable response time for on demand information processing acceptable to a user of the subject matter described (e.g., within a few seconds or less than ten seconds or so in certain systems). These terms, while difficult to precisely define are well understood by those skilled in the art. In this second example mode of operation, the DLNA client 102 performs specific queries of each of the DLNA server_1 106 through the DLNA server_N 110 based upon a user query for available A/V content. Each of the DLNA server_1 106 through the DLNA server_N 110 performs a filter operation and returns filtered A/V content information to the DLNA client 102. The DLNA client 102 presents the received filtered A/V content information within a flat non-hierarchical representation that allows the user to select the A/V content for rendering without separately accessing or navigating a directory hierarchy for each DLNA server.

Returning to the description of FIG. 1, the DLNA client 102 is also shown interconnected with a web-based rendering device 114 via a network 116. The network 116 may be any network, such as the Internet, capable of allowing communication between devices. A web-based protocol, such as by hypertext transfer protocol (HTTP) via transmission control protocol over Internet protocol (TCP/IP) may be used to communicate via the network 116. Protocol processing for aggregated and filtered A/V content information requests initiated by the web-based rendering device 114 will be described in more detail below beginning with FIG. 9. For purposes of the present description, the web-based rendering device 114 may access the DLNA client 102 via the network 116 to obtain and use the aggregating and filtering capabilities of the DLNA client 102. The DLNA client 102 includes bridging capabilities, to be described in more detail below, to allow the web-based rendering device 114 to communicate in its native web-based protocol without modification to access the aggregation and filtering capabilities of the DLNA client 102. Accordingly, the web-based rendering device 114 may access aggregated and filtered A/V content information and A/V content accessible via the home network 104 by use of the capabilities of the DLNA client 102.

It should be noted that the web-based rendering device 114 is illustrated within the FIG. 1 as a separate component located outside of the home network 104. However, this should not be considered limiting as the web-based rendering device 114 may be located within the home network 104 or may form a portion of the DLNA client 102 without departure from the scope of the present subject matter. As will be described in more detail below, for implementations where the web-based rendering device 114 forms a portion of the DLNA client 102, a reserved Internet protocol (IP) address of "127.0.0.1" may be used for internal communications between the web-based rendering device 114 and other components within the DLNA client 102.

Figure 2:
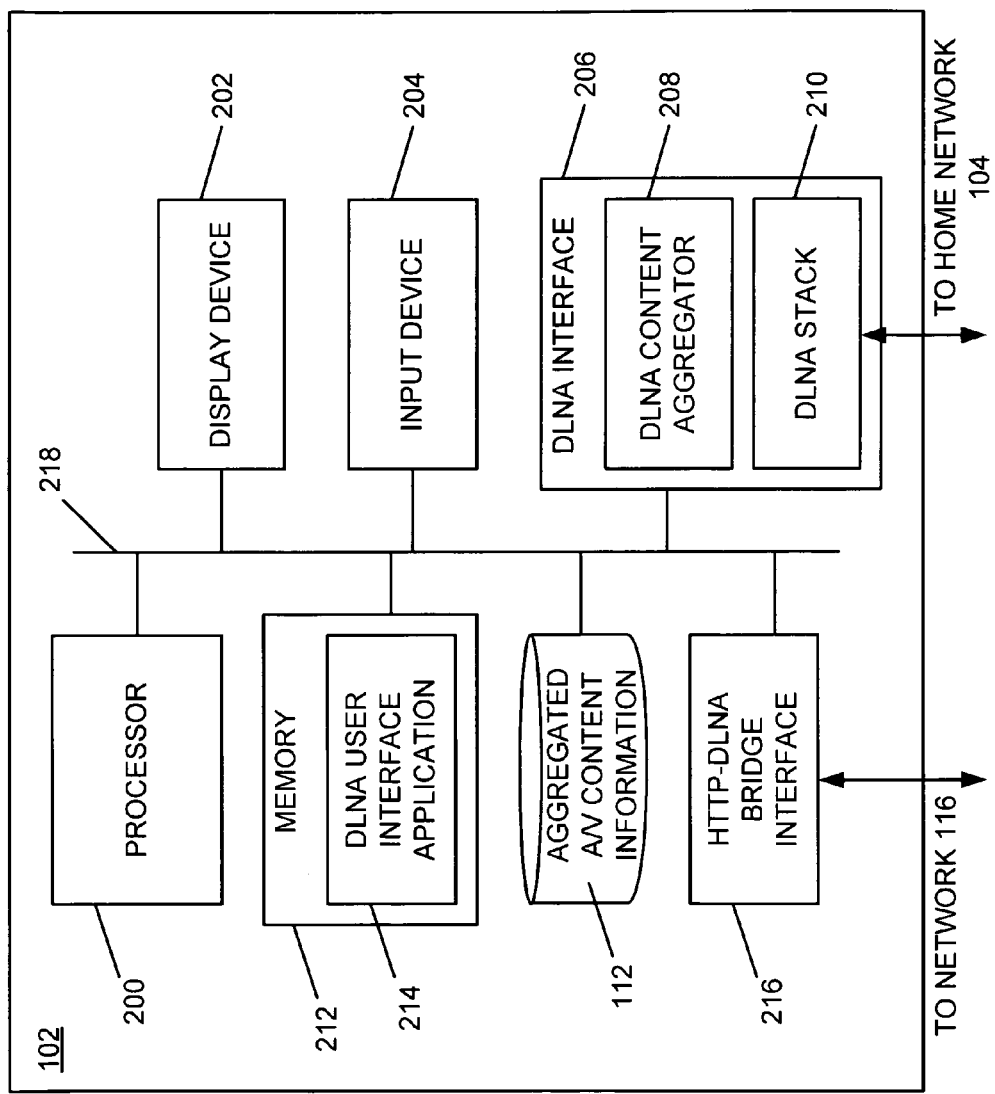
FIG. 2 is a block diagram of an example of an implementation of the DLNA client that provides automated aggregation and filtering of A/V content information representing available A/V content within the home network consistent with certain embodiments of the present invention.

FIG. 2 is a block diagram of an example of an implementation of the DLNA client 102 that provides automated aggregation and filtering of A/V content information representing available A/V content within the home network 104. A processor 200 provides computer instruction execution, computation, and other capabilities within the DLNA client 102. A display device 202 provides visual and/or other information to a user of the DLNA client 102. The display device 202 may include any type of display device, such as a cathode ray tube (CRT), liquid crystal display (LCD), light emitting diode (LED), projection or other display element or panel. An input device 204 provides input capabilities for the user. The input device 204 may include a mouse, pen, trackball, or other input device. One or more input devices, such as the input device 204, may be used.

As described above and in more detail below, the display device 202 presents a non-hierarchical pool of A/V identifier elements, such as thumbnail images or URIs, to a user and allows the user to select an A/V identifier element to access the associated A/V content for rendering without separately accessing or navigating a directory hierarchy for each DLNA server. Upon selection of the respective A/V identifier element, the associated URI is accessed to render the associated A/V content.

A DLNA interface 206 encapsulates the aggregation and filtering capabilities of the present subject matter and provides communication capabilities for interaction with the DLNA server_1 106 through the DLNA server_N 110 on the home network 104. The DLNA interface 206 includes a DLNA content aggregator 208 that provides the aggregation and filtering capabilities described above and in more detail below. A DLNA stack 210 provides the communication interface with the home network 104.

It should be noted that the DLNA interface 206 is illustrated with component-level modules for ease of illustration and description purposes. It is also understood that the DLNA interface 206 includes any hardware, programmed processor(s), and memory used to carry out the functions of the DLNA interface 206 as described above and in more detail below. For example, the DLNA interface 206 may include additional controller circuitry in the form of application specific integrated circuits (ASICs), processors, and/or discrete integrated circuits and components for performing electrical control activities associated with the DLNA interface 206. Additionally, the DLNA interface 206 also includes interrupt-level, stack-level, and application-level modules as appropriate. Furthermore, the DLNA interface 206 includes any memory components used for storage, execution, and data processing by these modules for performing processing activities associated with the DLNA interface 206. The DLNA interface 206 may also form a portion of other circuitry described below without departure from the scope of the present subject matter.

A memory 212 includes a DLNA user interface application 214 that organizes and displays the aggregated and filtered A/V content on the display device 202 or other display devices (not shown) as a non-hierarchical pool of A/V identifier elements, such as thumbnail images or URIs, and allows the user to select an A/V identifier element to access the associated A/V content for rendering without separately accessing or navigating a directory hierarchy for each DLNA server. Upon selection of the respective A/V identifier element, the associated URI is accessed to render the associated A/V content.

The DLNA user interface application 214 includes instructions executable by the processor 200 for performing these and other functions. The DLNA user interface application 214 may form a portion of an interrupt service routine (ISR), a portion of an operating system, or a portion of a separate application without departure from the scope of the present subject matter. Any firmware associated with a programmed processor that forms a portion of the DLNA interface 206 may be stored within, executed from, and use data storage space within the DLNA interface 206 or the memory 212 without departure from the scope of the present subject matter.

It is understood that the memory 212 may include any combination of volatile and non-volatile memory suitable for the intended purpose, distributed or localized as appropriate, and may include other memory segments not illustrated within the present example for ease of illustration purposes. For example, the memory 212 may include a code storage area, a code execution area, and a data area suitable for storage of the aggregated and filtered A/V content information and storage and execution of the DLNA user interface application 214 and any firmware associated with a programmed processor that forms a portion of the DLNA interface 206, as appropriate. It is also be understood that, though the aggregated A/V content information database 112 is illustrated as a separate component, the aggregated A/V content information may also be stored within the memory 212 as described above without departure from the scope of the present subject matter.

An HTTP-DLNA bridge interface 216 provides protocol mapping, conversion, and communication capabilities to allow the DLNA client 102 to communicate with external devices, such as the web-based rendering device 114, via the network 116. As described in more detail below beginning with FIG. 9, the HTTP-DLNA bridge interface 216 provides the aggregation and filtering capabilities of the DLNA client 102 to modules that do not communication via the DLNA protocol and that are not adapted to directly connect to the home network 104.

It should be noted that the HTTP-DLNA bridge interface 216 is illustrated as a component-level module for ease of illustration and description purposes. It is also understood that the HTTP-DLNA bridge interface 216 includes any hardware, programmed processor(s), and memory used to carry out the functions of the HTTP-DLNA bridge interface 216 as described above and in more detail below. For example, the HTTP-DLNA bridge interface 216 may include additional controller circuitry in the form of application specific integrated circuits (ASICs), processors, and/or discrete integrated circuits and components for performing electrical control activities associated with the HTTP-DLNA bridge interface 216. Additionally, the HTTP-DLNA bridge interface 216 also includes interrupt-level, stack-level, and application-level modules as appropriate. Furthermore, the HTTP-DLNA bridge interface 216 includes any memory components used for storage, execution, and data processing for performing processing activities associated with the HTTP-DLNA bridge interface 216. The HTTP-DLNA bridge interface 216 may also form a portion of other circuitry described below without departure from the scope of the present subject matter.

The processor 200, the display device 202, the input device 204, the DLNA interface 206, the memory 212, the aggregated A/V content information database 112, and the HTTP-DLNA bridge interface 216 are interconnected via one or more interconnections shown as interconnection 218 for ease of illustration. The interconnection 218 may include a system bus, a network, or any other interconnection capable of providing the respective components with suitable interconnection for the respective purpose.

Additionally, as described above, the web-based rendering device 114 may be located within the home network 104 or may form a portion of the DLNA client 102 without departure from the scope of the present subject matter. As such, for implementations where the web-based rendering device 114 forms a portion of the DLNA client 102, a reserved Internet protocol (IP) address of "127.0.0.1" may be used for internal communications between the web-based rendering device 114 and other components within the DLNA client 102, such as the processor 200.

Furthermore, components within the DLNA client 102 may be co-located or distributed within a network without departure from the scope of the present subject matter. For example, the components within the DLNA client 102 may be located within a stand-alone device, such as a personal computer (e.g., desktop or laptop) or handheld device (e.g., cellular telephone, personal digital assistant (PDA), email device, music recording or playback device, etc.). For a distributed arrangement, the display device 202 and the input device 204 may be located at a kiosk, while the processor 200 and memory 212 may be located at a local or remote server. Many other possible arrangements for the components of the DLNA client 102 are possible and all are considered within the scope of the present subject matter.

Figure 3:
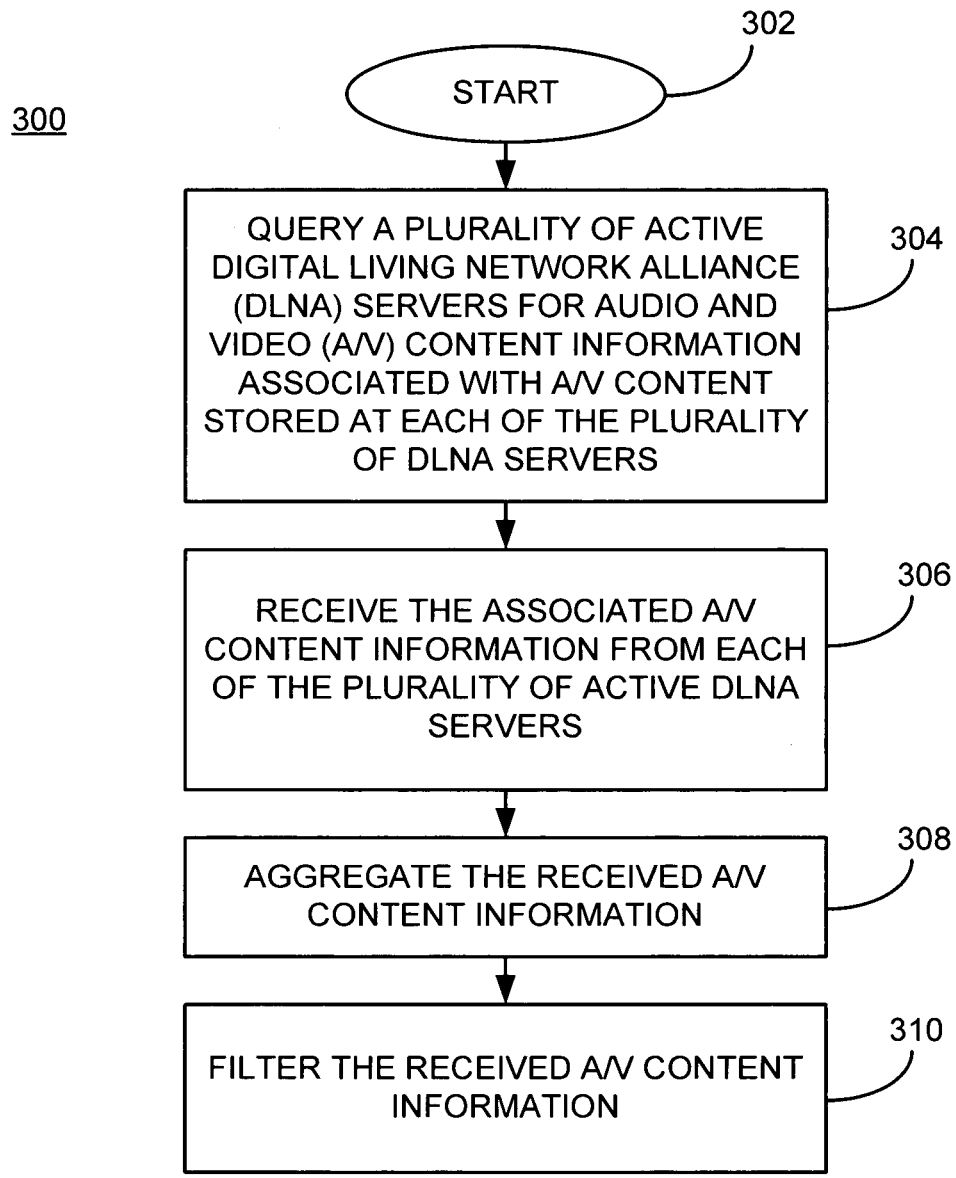
FIG. 3 is a flow chart of an example of an implementation of a process that provides automated aggregation and filtering of A/V content information representing available A/V content within the home network consistent with certain embodiments of the present invention.

FIG. 3 is a flow chart of an example of an implementation of a process 300 that provides automated aggregation and filtering of A/V content information representing available A/V content within the home network 104. The process 300 along with the other processes described below may be executed by any client device, such as the client 102, within the home network 104 to aggregate and filter A/V content information that is available within the home network 104. The process 300 starts at 302. At block 304, the process 300 queries a plurality of active DLNA servers, such as the DLNA server_1 106 through the DLNA server_N 110, for A/V content information associated with A/V content stored at each of the plurality of DLNA servers. At block 306, the process 300 receives the associated A/V content information from each of the plurality of active DLNA servers. The process 300 aggregates the received A/V content information at block 308 and filters the received A/V content information at block 310.

Figure 4:
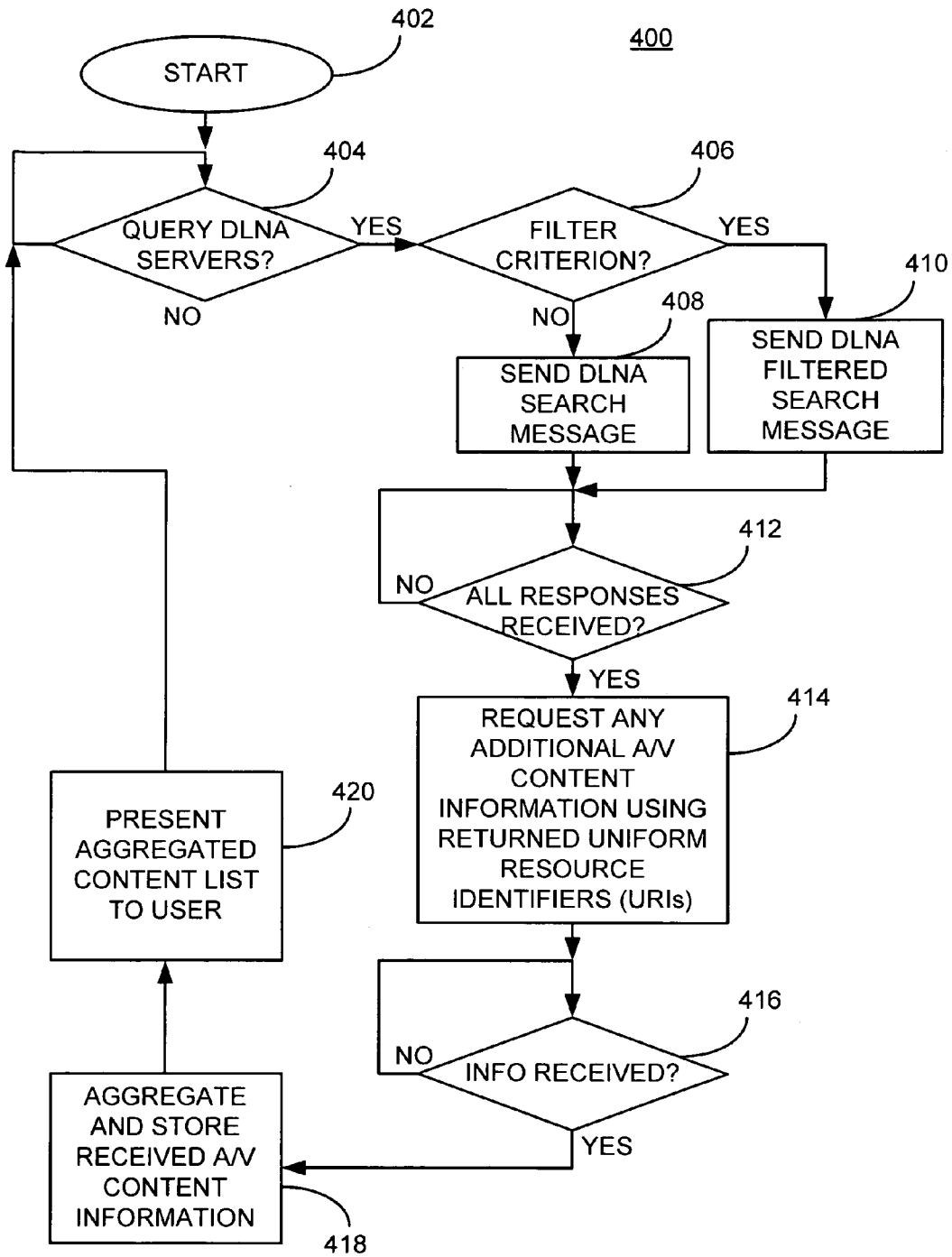
FIG. 4 is a flow chart of an example of an implementation of an alternative process that provides automated aggregation and filtering of A/V content information within the home network consistent with certain embodiments of the present invention.

FIG. 4 is a flow chart of an example of an implementation of an alternative process 400 that provides automated aggregation and filtering of A/V content information within the home network 104. The process 400 starts at 402. At decision point 404, the process 400 waits for a request to query one or more DLNA servers, such as the DLNA server_1 106 through the DLNA server_N 110, within the home network 104. For purposes of the present description, it is assumed that the DLNA client 102 maintains a list of active DLNA servers and that this list is updated either periodically or as DLNA servers enter and leave the home network 104. Accordingly, the DLNA client 102 may issue queries to any active DLNA server in response to a user query request or to build a content base as described in more detail below. It should also be noted that the query request may be associated with an internal startup, scheduled, or other operation or event associated with the DLNA client 102, associated with a determination that a DLNA server has been recently activated within the home network 104, or performed in response to a user query request without departure from the scope of the present subject matter.

Upon receipt of a request to query one or more DLNA servers at decision point 404, the process 400 makes a determination at decision point 406 as to whether at least one filter criterion is associated with the query request. A filter criterion may include a criterion such as content type, genre, title, runtime, date of production, or other type of filtering criterion that may be used to filter and categorize available A/V content within the home network 104. When a determination is made that the query request does not include at least one filter criterion, the process 400 sends a DLNA search message to one or more DLNA servers, such as the DLNA server_1 106 through the DLNA server_N 110, within the home network 104 at block 408.

DLNA search messages may include information such as container identifiers, search criteria, filter criteria, starting index, requested return item count, and sort criteria. A response message received from a DLNA server may include the number of entries returned, a list of A/V content information entries, and a total number of entries that matched the requested search criteria. The total number of entries that matched the requested search criteria may be used to determine whether to request additional A/V content information from a respective DLNA server as a user browses the aggregated A/V content information.

An example DLNA search message that requests A/V content information for video items stored at a given DLNA server is illustrated below. The DLNA search message below requests the return of A/V content information for one hundred (100) video items beginning at index zero (0) on the DLNA server sorted in ascending order based upon title.

Search("0", "upnp:class=object.item.videoItem", "*", 0, 100, "+dc:title")

As can be seen from the example DLNA search message above, control of the search results returned by a given DLNA server may be managed from the DLNA client 102. Furthermore, as a user completes review of the returned A/V content information, a next group of A/V content information may be requested, such as A/V content information for the next one hundred (100) video items stored beginning at index one hundred and one (101) (e.g., video items indexed from 101 through 200). By reducing the amount of A/V content information requested, storage capacity may be reduced at the DLNA client 102. Additionally, search bandwidth requirements may be reduced by distributing A/V content searches over time.

Returning to the example of FIG. 4, when a determination is made at decision point 406 that the query request includes at least one filter criterion, the process 400 sends a DLNA filtered search message to one or more DLNA servers, such as the DLNA server_1 106 through the DLNA server_N 110, within the home network 104 at block 410. An example DLNA filtered search message, also known as a DLNA compound search message, usable to request A/V content information for image items stored at a given DLNA server is illustrated below. The DLNA filtered search message below requests the return of A/V content information for ten (10) image items dated in the month of October of 2008 indexed beginning at index zero (0) at the DLNA server sorted in ascending order based upon title.

Search("0", "upnp:class = object.item.imageItem" and
"(dc:date >= "2008-10-01" and dc:date <= "2008-10-31" )",
"*", 0 , 10, "+dc:date")

As can be seen from this example DLNA filtered search message, filtering of the search results returned by a given DLNA server may be managed from the DLNA client 102. Furthermore, by requesting filtering of the A/V content information returned by the given DLNA servers, storage capacity may be further reduced at the DLNA client 102 and search bandwidth requirements may also be reduced. However, it should be understood that filtering may be performed at the DLNA client 102 without departure from the scope of the present subject matter.

As described above, there may be occasions for sending a single DLNA search message to a single DLNA server and there may also be occasions for sending a DLNA search message to each active DLNA server within the home network. For example, when a newly activated DLNA server enters the home network 104, the process 400 may receive a query request to query the newly activated DLNA server. Alternatively, an internal startup, scheduled, or other operation or event associated with the DLNA client 102 may result in a search of all active DLNA servers within the home network 104.

In either situation, the process 400 waits at decision point 412 for all responses to be received. It should be noted that time out procedures and other error control procedures are not illustrated within the example process 400 for ease of illustration purposes. However, it is understood that all such procedures are considered to be within the scope of the present subject matter for the example process 400 or any other process described below.

Within the present example, the responses received include A/V content information in the form of the URIs described above that form hyperlinks to the storage location of the referenced A/V content. Additionally, the A/V content information may include thumbnail images and other information, such as a category, genre, title, runtime, date, and server identifier without departure from the scope of the present subject matter.

Continuing with the present example, when the URIs are received, the URIs may be used to retrieve thumbnail images and other A/V content information. Accordingly, when a determination is made at decision point 412 that all anticipated responses have been received, the process 400 may request any additional information, such as thumbnail images, using the received URIs at block 414. When additional information is requested, the process 400 waits at decision point 416 for the requested A/V content information to be received.

When a determination is made at decision point 416 that the requested A/V content information has been received, the process 400 aggregates and stores the received A/V content information at block 418. It should be noted that while the present example illustrates receipt of both URIs and separate processing to retrieve additional A/V content information prior to aggregating the received information, the aggregation and storage at block 418 may be performed on the received URIs with or without receipt of additional A/V content information without departure from the scope of the present subject matter. When additional A/V content information is received after aggregation of the URIs, any received A/V content information may then be aggregated with the previously aggregated URIs.

Accordingly, the A/V content information may be aggregated based upon any one or more of the available information elements within the A/V content information. For example, the aggregation performed by the process 400 may include collecting images or links, such as thumbnail images or URIs, respectively, that form a portion of the A/V content information for each item returned. The collected thumbnail images or URIs may be organized into arrays or other data structures and stored within the aggregated A/V content information database 112 for representation and presentation to a user of the DLNA client 102. Furthermore, information such as the category, genre, title, runtime, and date may be used for sorting and categorizing purposes, and the sorted or categorized associations may be stored within the aggregated A/V content information database 112 and presented to the user.

The process 400 presents the aggregated A/V content information based upon any requested filter criteria to a user at block 420. The aggregated A/V content information may be presented on any display device, such as the display device 202. The process 400 returns to decision point 404 to await a new query request. Accordingly, the process 400 provides filtering and aggregation of A/V content information, while also reducing memory storage requirements for the filtered and aggregated A/V content information and reducing communication bandwidth.

Figure 5A:
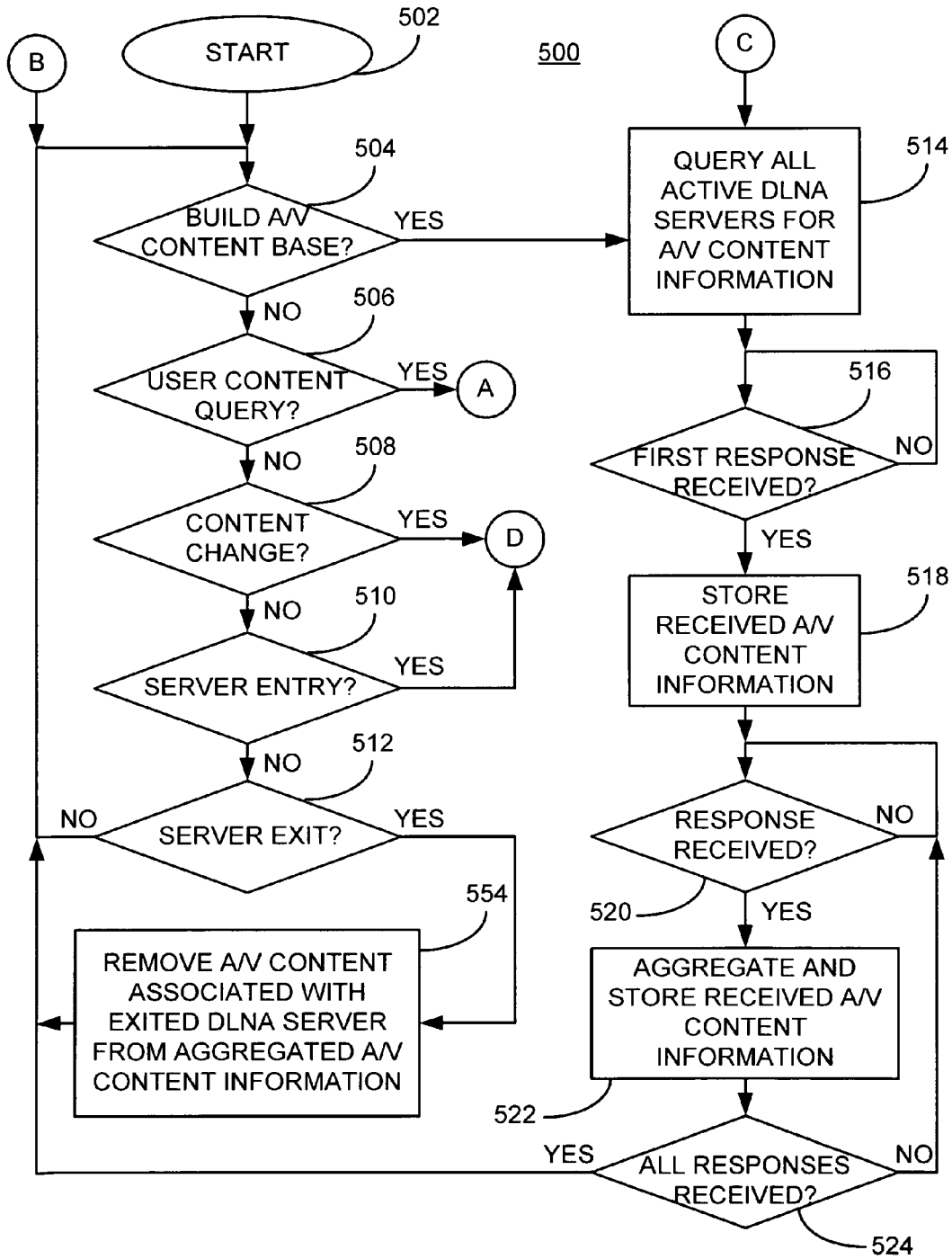
FIG. 5A is a flow chart of an example of an implementation of a first portion of a process that provides additional detail associated with operations for the automated aggregation and filtering of A/V content information within the home network consistent with certain embodiments of the present invention.
Figure 5B:
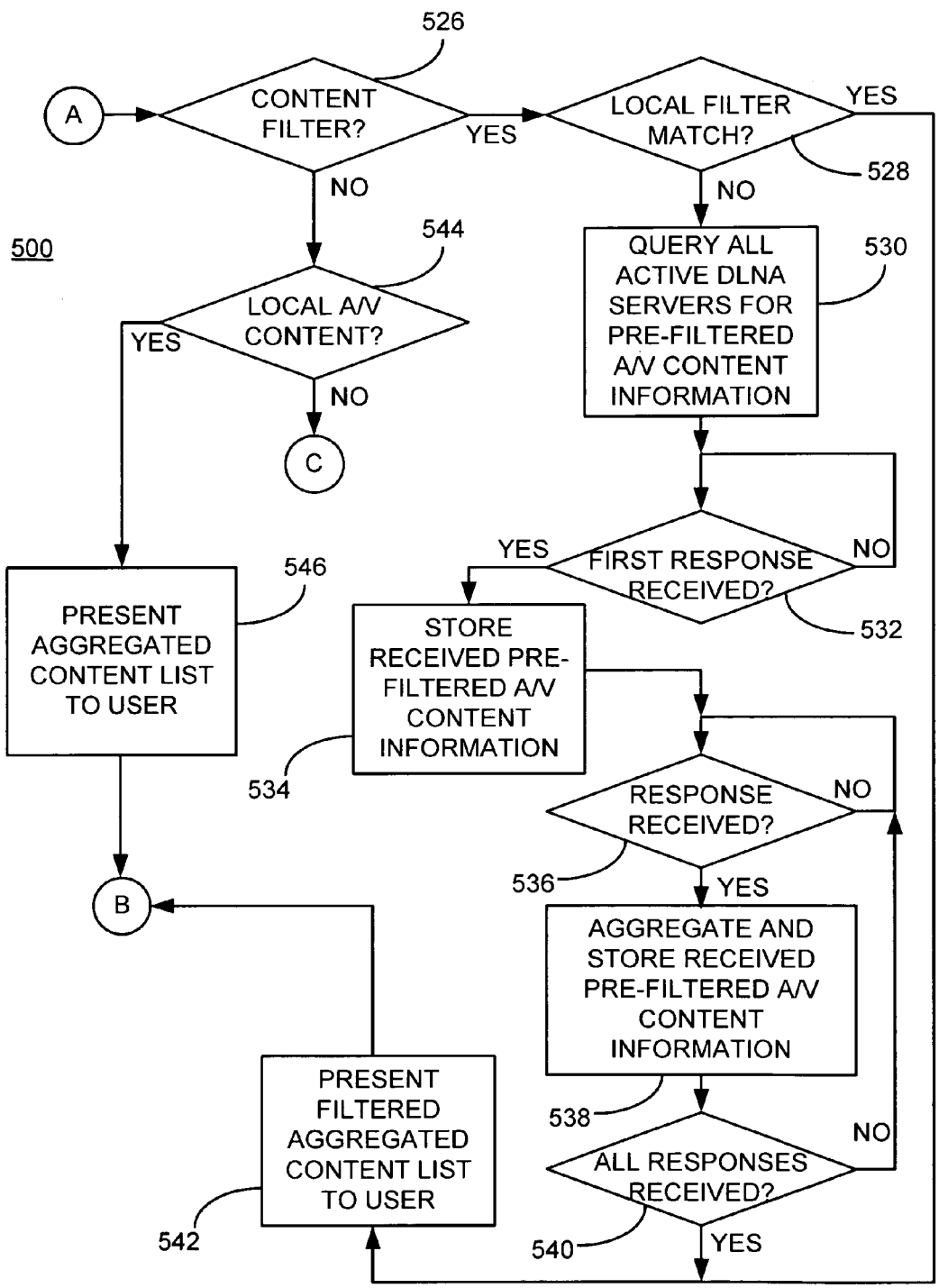
FIG. 5B is a flow chart of an example of an implementation of a second portion of a process that provides additional detail associated with operations for the automated aggregation and filtering of A/V content information within the home network consistent with certain embodiments of the present invention.
Figure 5C:
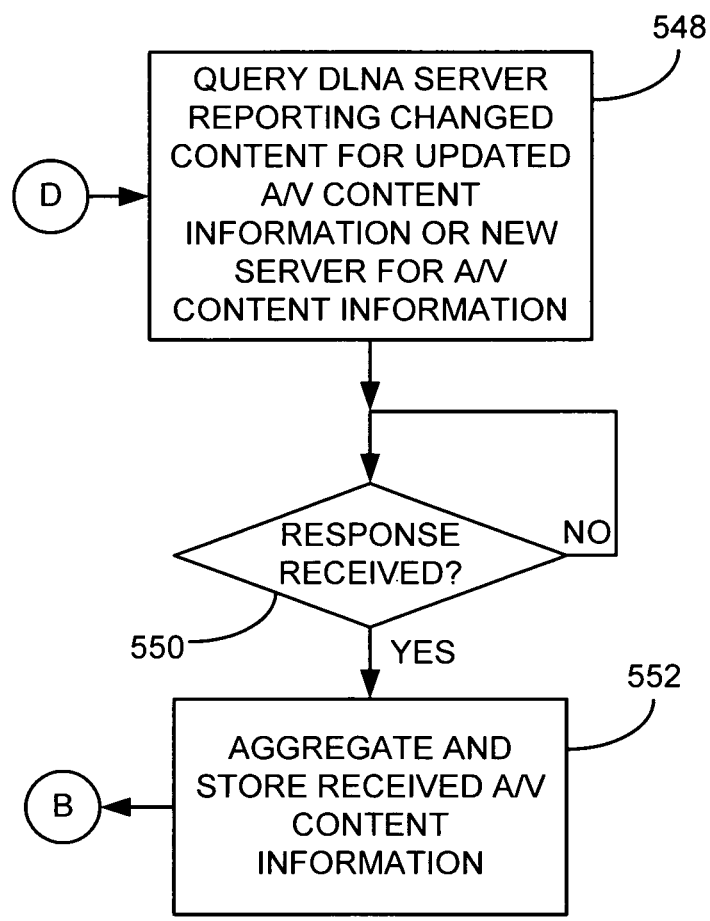
FIG. 5C is a flow chart of an example of an implementation of a third portion of a process that provides additional detail associated with operations for the automated aggregation and filtering of A/V content information within the home network consistent with certain embodiments of the present invention.

FIGS. 5A-5C illustrate a flow chart of an example of an implementation of a process 500 that provides additional detail associated with operations for the automated aggregation and filtering of A/V content information within the home network 104. The process 500 starts within FIG. 5A at 502. At decision point 504, the process 500 makes a determination as to whether to build an aggregated A/V content information database, such as the aggregated A/V content information database 112.

As described above, the aggregated A/V content information database 112 may be built for purposes of locally storing A/V content information for all content available within the home network 104 to provide more rapid responses to A/V content query requests from a user for renderable A/V content. Accordingly, the aggregated A/V content information database 112 may be built during an internal startup operation for an A/V content information aggregation and filtering device, such as the DLNA client 102. Alternatively, the aggregated A/V content information database 112 may be built or updated based upon a scheduled operation or in response to other events, such as a user request to rebuild the aggregated A/V content information database 112. As such, the aggregated A/V content information database 112 may be created or rebuilt at any point during operation of the DLNA client 102. Accordingly, any such criteria may be used in association with decision point 504 to make a determination to build the aggregated A/V content information database 112.

To further facilitate higher level understanding of the process 500, a description of events associated within building the aggregated A/V content information database 112 and other lower level processing will be described further below after a description of higher level decision points within the process 500. Accordingly, when a determination is made that the aggregated A/V content information database 112 is not to be built, the process 500 makes a determination as to whether a user has requested an A/V content query at decision point 506.

When a determination is made that the user has not requested an A/V content query, the process 500 makes a determination as to whether an A/V content change has occurred within the home network 104 at decision point 508. When a determination is made that no change to any A/V content within the home network 104 has occurred, the process 500 makes a determination as to whether a server has entered the home network 104 at decision point 510. When a determination is made that there has not been a DLNA server entry into the home network 104, the process 500 makes a determination as to whether a DLNA server has exited the home network 104 at decision point 512. When a determination is made that there has not been a DLNA server exit from the home network 104, the process 500 returns to decision point 504 to make a determination as to whether to build or rebuild the aggregated A/V content information database 112. The process 500 iteratively processes the decisions associated with decision points 504 through 512 as described above until any of these decision points results in a positive determination.

It should be noted that content changes, DLNA server entries, and DLNA sever exits may be reported by DLNA servers, such as the DLNA server_1 106 through the DLNA server_N 110, via DLNA messaging (not shown) similar to that described above. Additionally, subscription services that form a portion of the DLNA protocol may be used to cause update messages for content changes to be generated and sent from DLNA servers. Accordingly, it is assumed that appropriate DLNA messaging occurs between the DLNA client 102 and any of the DLNA server_1 106 through the DLNA server_N 110 to trigger events that result in the associated determinations described above.

Returning to the description of decision point 504, when a determination is made to build or rebuild the aggregated A/V content information database 112, the process 500 queries all active DLNA servers for A/V content information at block 514. The process 500 waits at decision point 516 for a response from a first of the queried DLNA servers to be received. When the first response is received, the process 500 stores the received A/V content information, such as within the aggregated A/V content information database 112, at block 518. At decision point 520, the process 500 waits for an additional response to be received. When an additional response is received, the process 500 aggregates the received A/V content information with previously received A/V content information and stores the aggregated A/V content information to the aggregated A/V content information database 112 at block 522.

As described above, the A/V content information received may include thumbnail images, URIs forming hyperlinks to the storage location of the referenced A/V content, and other information, such as a category, genre, title, runtime, date, and server identifier. Accordingly, the A/V content information may be aggregated based upon any one or more of the available information elements within the A/V content information. For example, the aggregation performed by the process 500 may include collecting images or links, such as thumbnail images or URIs, respectively, that form a portion of the A/V content information for each item returned. The collected thumbnail images or URIs may be organized into arrays or other data structures and stored within the aggregated A/V content information database 112 for representation and presentation to a user of the DLNA client 102. Furthermore, information such as the category, genre, title, runtime, and date may be used for sorting and categorizing purposes, and the sorted or categorized associations may be stored within the aggregated A/V content information database 112 and presented to the user.

At decision point 524, the process 500 makes a determination as to whether all anticipated responses have been received. If a determination is made that not all anticipated responses have been received, the process 500 returns to decision point 520 to await another response. When a determination is made that all anticipated responses have been received or a timeout or other terminating event occurs, the process 500 returns to decision point 504 to continue with the higher level processing described above.

Returning to the description of decision point 506, when a determination is made that the user has requested an A/V content query, the process 500 continues processing as described in association with FIG. 5B. With reference to FIG. 5B, the process 500 makes a determination at decision point 526 as to whether an A/V content filter has been requested as a portion of the user A/V content query. For example, the user may request a query for an A/V content type of movie and a genre of western. Additional example filtering criteria include criteria such as a production date range, an actor name, a producer name, and a country of production.

When an A/V content filter has been requested as a portion of the user A/V content query, a determination is made at decision point 528 as to whether there is a local match within the aggregated A/V content information database 112 based upon the A/V content filter. When a determination is made that there is no local match for the requested A/V content filter, the process 500 queries all active DLNA servers, such as the DLNA server_1 106 through the DLNA server_N 110, for pre-filtered A/V content information at block 530. These queries may be issued using DLNA messaging similar to that described above.

At decision point 532, the process 500 waits for a first response to be received from a one of the queried DLNA servers. When the first response is received, the process 500 stores the received pre-filtered A/V content information, such as within the aggregated A/V content information database 112, at block 534. At decision point 536, the process 500 waits for an additional response to be received. When an additional response is received, the process 500 aggregates the received pre-filtered A/V content information with previously received pre-filtered A/V content information and stores the aggregated pre-filtered A/V content information to the aggregated A/V content information database 112 at block 538. The aggregated pre-filtered A/V content information may be stored within a separate table from other A/V content information or may be otherwise identified within the aggregated A/V content information database 112 as appropriate.

At decision point 540, the process 500 makes a determination as to whether all anticipated responses have been received. If a determination is made that not all anticipated responses have been received, the process 500 returns to decision point 536 to await another response. When a determination is made that all anticipated responses have been received at decision point 540 (or a timeout or other terminating event has occurred) or that there is a local match within the aggregated A/V content information database 112 based upon the A/V content filter at decision point 528, the process 500 presents the filtered aggregated A/V content information to the user, such as via the display device 202, at block 542 and returns to decision point 504 (See FIG. 5A) to continue with the higher level processing described above.

Returning to the description of decision point 526, when a determination is made that an A/V content filter has not been requested as a portion of the user A/V content query, the process 500 makes a determination at decision point 544 as to whether local A/V content information is available within the aggregated A/V content information database 112 for response to the request. The local A/V content information includes any A/V content information that was previously retrieved during a build operation of the aggregated A/V content information database 112 as described above. When a determination is made that local A/V content information is not available, the process 500 continues as described above beginning with block 514 (See FIG. 5A). When a determination is made that local A/V content information is available within the aggregated A/V content information database 112, the process 500 presents the aggregated A/V content information list to the user, such as via the display device 202, at block 546 and returns to decision point 504 (See FIG. 5A) to continue with the higher level processing described above.

Returning again to FIG. 5A and the description of decision points 508 and 510, when a determination is made either that an A/V content change has occurred within the home network 104 at decision point 508 or that a server has entered the home network 104 at decision point 510, the process 500 continues processing as illustrated within FIG. 5C.

At block 548, the process 500 queries the DLNA server reporting changed content for updated A/V content information or the new DLNA server for A/V content information. The process 500 waits at decision point 550 for a response to be received. When a response is received, the process 500 aggregates and stores the received A/V content information with the other A/V content information stored within the aggregated A/V content information database 112 at block 552 and the process 500 returns to decision point 504 (See FIG. 5A) to continue with the higher level processing described above.

Returning again to FIG. 5A and the description of decision point 512, when a determination is made that a DLNA server is exiting or has exited the home network 104, the process 500 removes the A/V content information associated with the exited DLNA server from the aggregated A/V content information stored within the aggregated A/V content information database 112 at block 554 and returns to decision point 504 to continue with the higher level processing described above.

As such, the process 500 provides for building and rebuilding of the aggregated A/V content information database 112, for filtering A/V content information stored within the aggregated A/V content information database 112, for pre-filtering queries to the DLNA server_1 106 through the DLNA server_N 110. The process 500 also responds to A/V content changes within the home network 104, new DLNA server entry into the home network 104, and DLNA server exits from the home network 104.

Aggregated User Interface Processing

Figure 6:
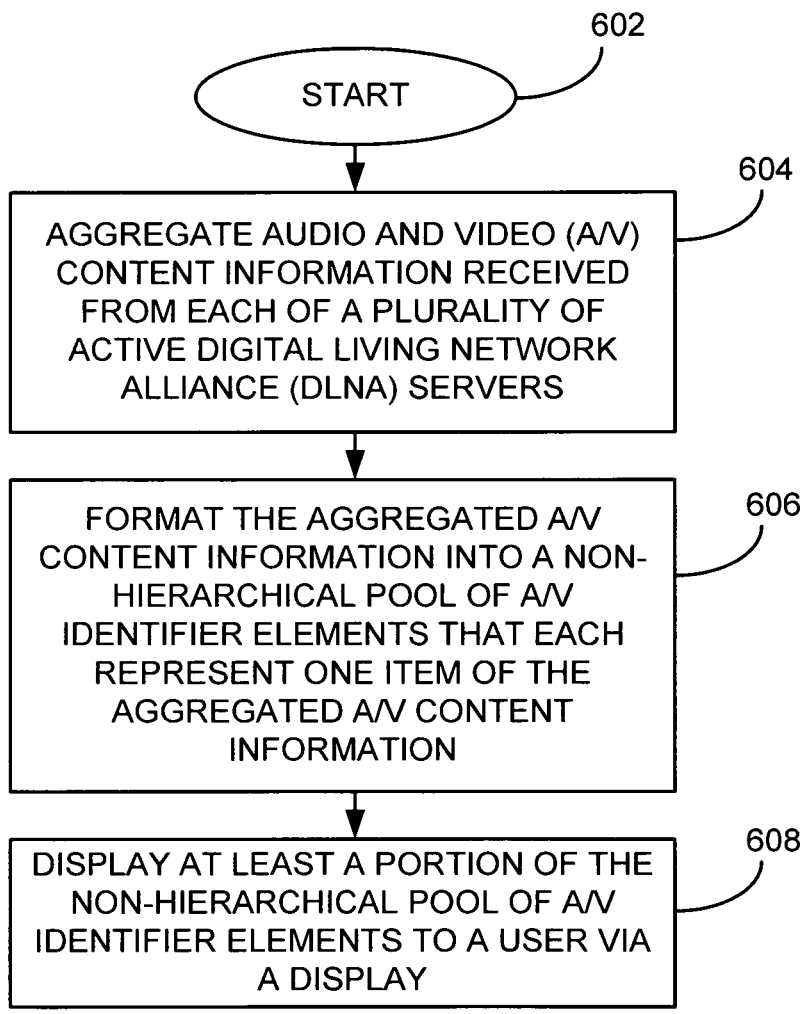
FIG. 6 is a flow chart of an example of an implementation of a process for user interface processing for aggregated and filtered A/V content information consistent with certain embodiments of the present invention.

FIG. 6 is a flow chart of an example of an implementation of a process 600 for user interface processing for aggregated and filtered A/V content information. The process 600 may form a portion of the DLNA user interface application 214 described above and may be used to display information on the display device 202. The process 600 starts at 602. At block 604, the process 600 aggregates A/V content information received from each of a plurality of active DLNA servers. At block 606, the process 600 formats the aggregated A/V content information into a non-hierarchical pool of A/V identifier elements that each represent one item of the aggregated A/V content information. At block 608, the process 600 displays at least a portion of the non-hierarchical pool of A/V identifier elements to a user via a display device, such as the display device 202.

Figure 7A:
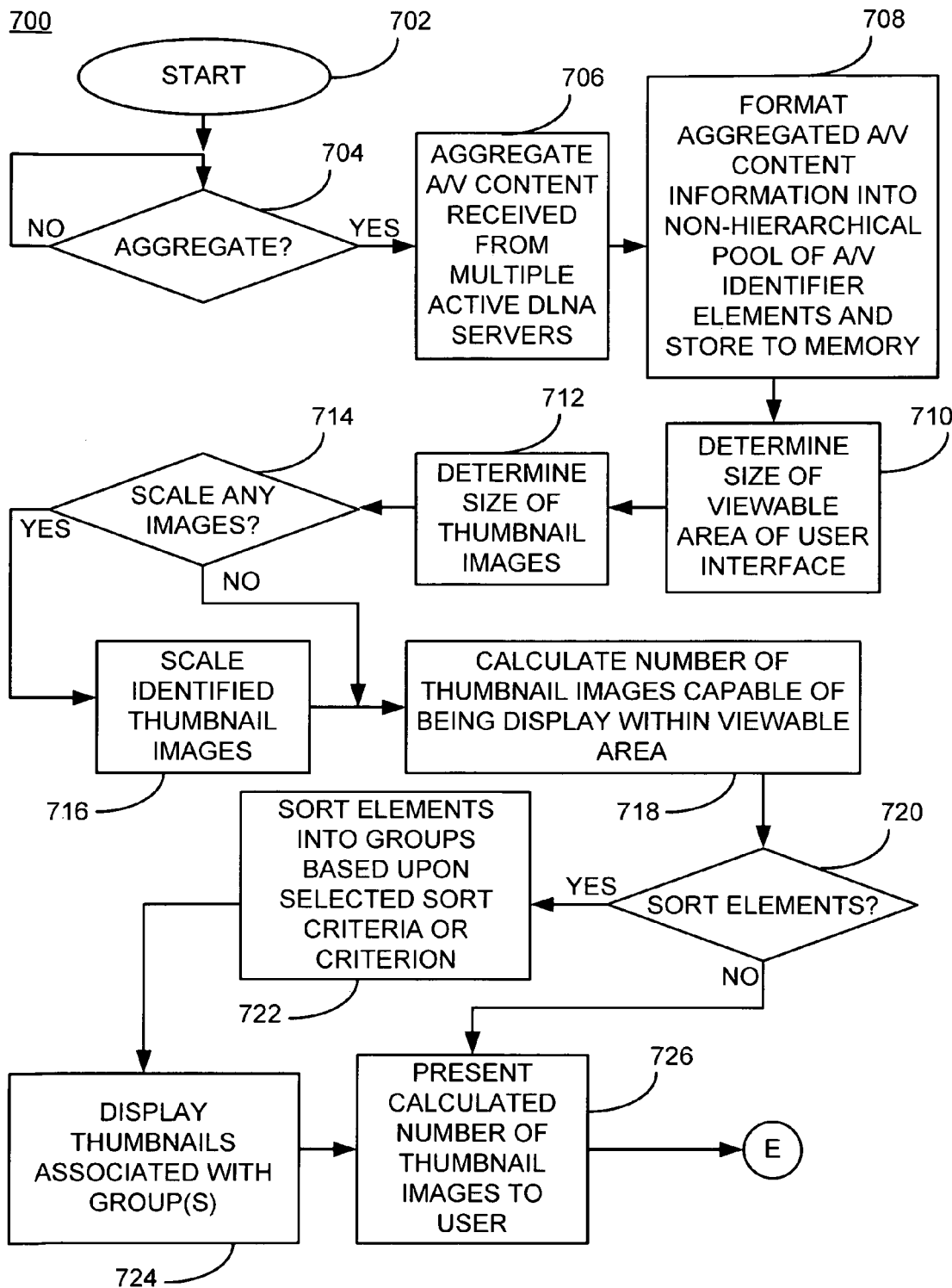
FIG. 7A is a flow chart of an example of an implementation of a first portion of a process that provides additional detail associated with operations for user interface processing for aggregated and filtered A/V content information consistent with certain embodiments of the present invention.
Figure 7B:
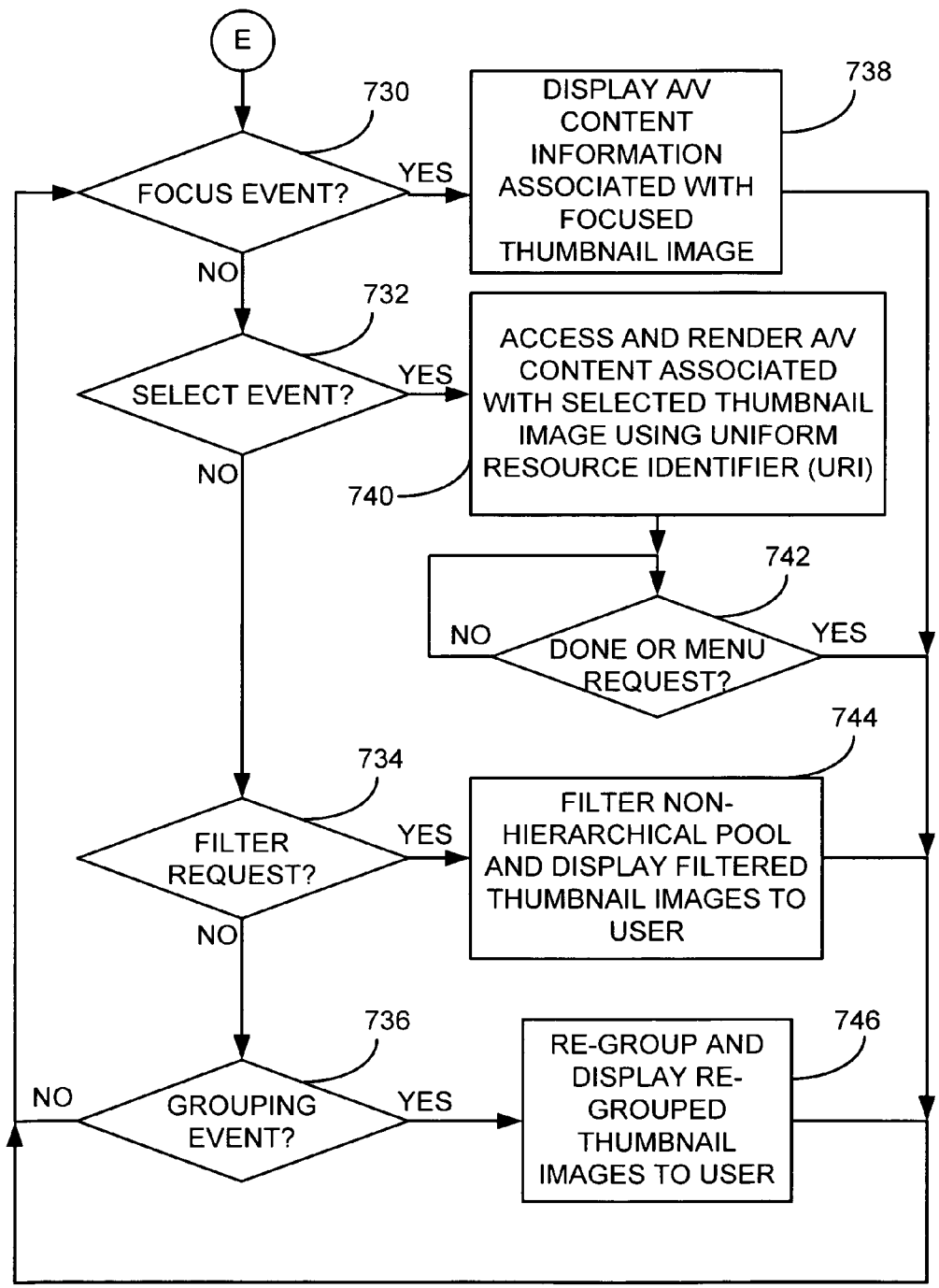
FIG. 7B is a flow chart of an example of an implementation of a second portion of a process that provides additional detail associated with operations for user interface processing for aggregated and filtered A/V content information consistent with certain embodiments of the present invention.

FIGS. 7A-7B illustrate a flow chart of an example of an implementation of a process 700 that provides additional detail associated with operations for user interface processing for aggregated and filtered A/V content information. The process 700 may also form a portion of the DLNA user interface application 214 described above and may be used to display information on a display device, such as the display device 202. The process 700 starts within FIG. 7A at 702. At decision point 704, the process 700 waits for a request to aggregate A/V content information. As described above and in more detail below, the request may be generated by a user of the DLNA client 102 via inputs generated by the input device 204.

When a request to aggregate A/V content information is received, the process 700 aggregates A/V content information received from multiple active DLNA servers at block 706. For ease of illustration purposes, intervening steps for querying active DLNA servers and related activities, such as those described above in association with other examples, are not illustrated within FIG. 7A. However, it is understood that the process 700 may also include such actions as those described in the examples above without departure from the scope of the present subject matter.

At block 708, the process 700 formats the aggregated A/V content information into a non-hierarchical pool of A/V identifier elements that each represent one item of the aggregated A/V content information and stores the aggregated A/V content information and the resulting non-hierarchical pool of A/V identifier elements to a memory, such as the memory 212. For example, each item of aggregated A/V content information may be referenced by reference to a thumbnail image or URI associated with each item of formatted A/V content information. Accordingly, the non-hierarchical pool of A/V identifier elements may include the thumbnail images and URIs associated with each of item of aggregated A/V content. As such, the process 700 may organize each item of the non-hierarchical pool of A/V identifier elements into a list or other form of organizational structure. The resulting organization may be stored within the memory 212 for access, filtering, and other operations as described above and in more detail below.

At block 710, the process 700 determines a size of a viewable area of the display device 202. At block 712, the process 700 determines sizes of all associated thumbnail images. For purposes of the present description, a thumbnail image may be a still image received from a DLNA server, such as the DLNA server_1 106 through the DLNA server_N 110, that represents the A/V content stored on the respective DLNA server. Accordingly, if any of the thumbnail images vary in size, the process 700 may determine the size variations of the respective thumbnail images.

At decision point 714, the process 700 makes a determination as to whether to scale any of the thumbnail images for consistency of size and identifies which of the thumbnail images to scale. If a determination is made to scale any of the thumbnail images, the process 700 scales the identified thumbnail images at block 716. When the scaling of the thumbnail images is completed or upon a determination at decision point 714 that no scaling is to be performed, the process 700 calculates and determines a number of thumbnail images that may be displayed at block 718.

At decision point 720, the process 700 makes a determination as to whether to sort any elements within of the non-hierarchical pool of A/V identifier elements. Sorting may be performed based upon the aggregated A/V content information, such as content type or genre, associated with the respective elements. When a determination is made to sort elements associated with the non-hierarchical pool of A/V identifier elements, the process 700 sorts the elements into groups based upon the selected sort criteria or criterion at block 722. At block 724, the process 700 displays thumbnails, associated with any group(s) created on the display device 202. When a determination is made not to sort any elements within the non-hierarchical pool of A/V identifier elements at decision point 720 or when the thumbnails associated with any group(s) created has been displayed, the process 700 presents the calculated number of thumbnail images to a user on the display device 202 at block 726 and continues with processing as described below in association with FIG. 7B.

Referring to FIG. 7B, the process 700 enters a processing loop beginning with decision point 730. At decision point 730, the process 700 makes a determination as to whether a focus event has occurred in association with a displayed thumbnail image. To further facilitate higher level understanding of the process 700, a description of events associated within processing of events and other lower level processing will be described further below after a description of higher level decision points within the process 700. Accordingly, when a determination is made that a focus event has not occurred, the process 700 makes a determination as to whether a select event has occurred in association with a displayed thumbnail image at decision point 732. When a determination is made that a select event has not occurred, the process 700 makes a determination as to whether a filter request has been received at decision point 734. When a determination is made that a filter request has not been received, the process 700 makes a determination as to whether a grouping event has occurred at decision point 736. When a determination is made that a grouping event has not occurred, the process 700 iterates to decision point 730 and processing continues as described above and in more detail below.

When a determination is made at decision point 730 that a focus event has occurred, the process 700 displays A/V content information associated with the focused thumbnail image at block 738. The displayed A/V content information may include a title, runtime, or other information associated with the thumbnail image. The A/V content information may be displayed within a status area of the display device 202 or in any other suitable manner without departure from the scope of the present subject matter. After the A/V content information associated with the focused thumbnail image has been displayed, the process returns to decision point 730 and iterates as described above.

Returning to the description of decision point 732, when a determination is made that a select event has occurred, the process 700 accesses and renders A/V content associated with the selected thumbnail image at block 740 using the URI associated with the thumbnail image gathered during and forming a portion of the non-hierarchical pool of A/V identifier elements. At decision point 742, the process 700 makes a determination as to whether the rendering of the A/V content has completed or whether there has been another menu request. In response to a determination that rendering of the A/V content has completed or that a menu request has been received, the process 700 returns to decision point 730 and iterates as described above.

Returning to the description of decision point 734, when a determination is made that a filter request has been received, the process 700 filters the non-hierarchical pool of A/V identifier elements and displays the thumbnail images associated with the filtered non-hierarchical pool of A/V identifier elements to the user at block 744. The process 700 returns to decision point 730 and iterates as described above.

Returning to the description of decision point 736, when a determination is made that a grouping event has occurred, the process 700 re-groups the non-hierarchical pool of A/V identifier elements and displays the thumbnail images associated with the re-grouped non-hierarchical pool of A/V identifier elements to the user at block 746. This re-grouping may be based upon a request from a user or an internal event indicating that re-grouping should be performed. For example, a user request to re-group A/V content information may be based upon a requested change of category associated with the aggregated A/V content, alphabetization of title, date re-grouping, or any other type of re-grouping. Additionally, an internal event for re-grouping may be generated in response to a DLNA server, such as the DLNA server_1 106 through the DLNA server_N 110, entering or exiting the home network 104. For ease of illustration purposes, intervening steps for querying active DLNA servers and related activities, such as those described above in association with other examples, are not illustrated within FIG. 7B. However, it is understood that the process 700 may also include such actions as those described in the examples above without departure from the scope of the present subject matter. After displaying thumbnail images associated with the re-grouped A/V content information, the process 700 returns to decision point 730 and iterates as described above.

It should be understood that many variations on the process 700 and the other processes described in association with the present subject matter are possible. For example, within the process 700, a filter request may be combined with a grouping request without departure from the present subject matter. In such a case, appropriate actions similar to those described above for each action may be performed in response to receipt of the combined request. Accordingly, variations on the process 700 or variations on any other processes described herein are considered within the scope of the present subject matter.

Figure 8:
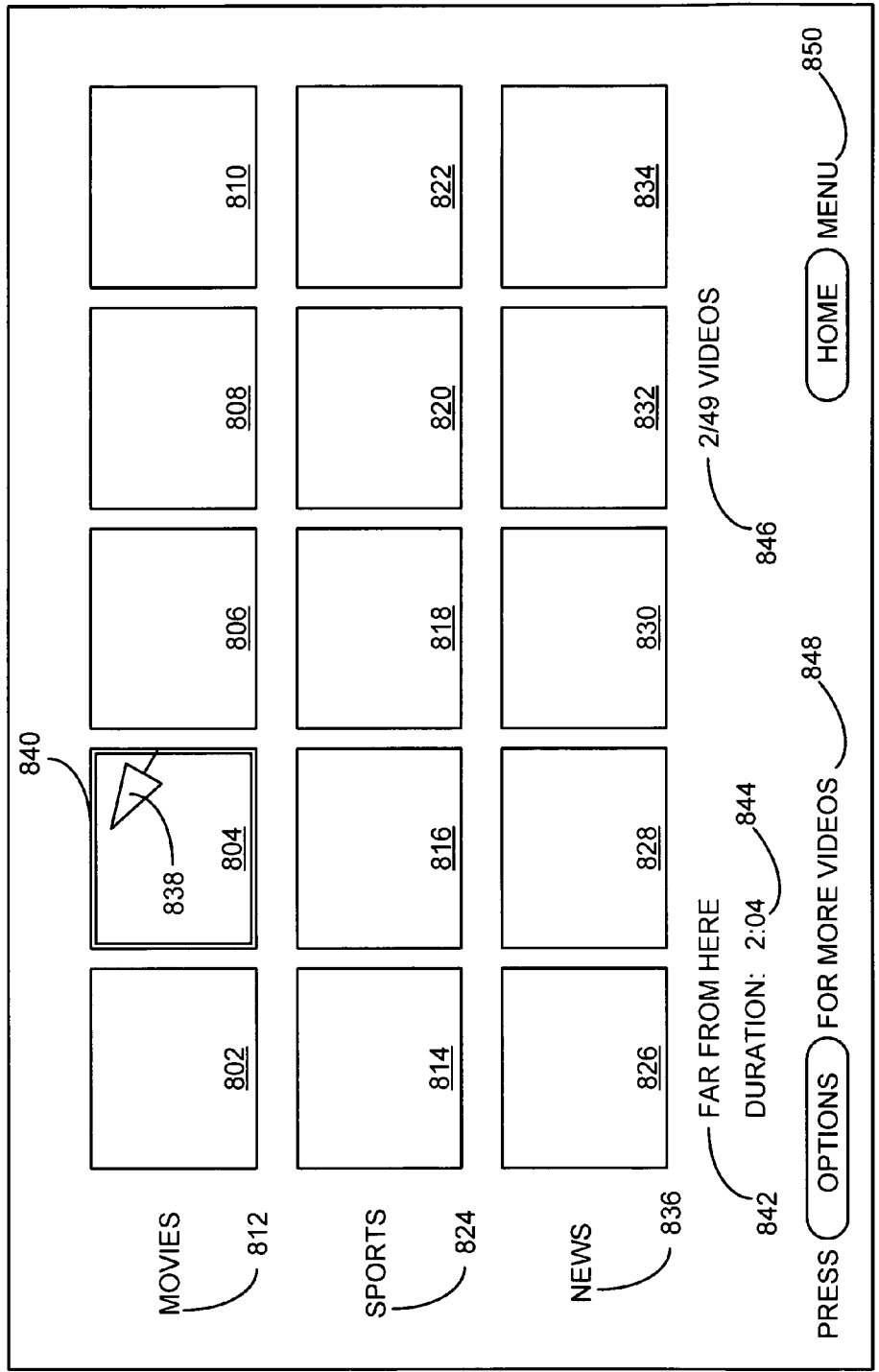
FIG. 8 is an example of an implementation of a user interface that may be displayed on the display device for displaying aggregated, formatted, and grouped A/V content information without referring to or requiring a user to navigate directory hierarchies associated with specific DLNA servers where A/V content is stored consistent with certain embodiments of the present invention.

FIG. 8 is an example of an implementation of the user interface that may be displayed on the display device 202 for displaying aggregated, formatted, and grouped A/V content information without referring to or requiring the user to navigate directory hierarchies associated with specific DLNA servers where A/V content is stored. As can be seen from FIG. 8, thumbnail images 802, 804, 806, 808, and 810 are categorized and grouped with a label movies 812. Likewise, thumbnail images 814, 816, 818, 820, and 822 are categorized and grouped with a label sports 824 and thumbnail images 826, 828, 830, 832, and 834 are categorized and grouped with a label news 836.

As such, thumbnail images that form a portion of the aggregated and formatted A/V content information as represented by the non-hierarchical pool of A/V identifier elements are grouped into separate rows within this example for display on the display device 202. It should be understood that many other possible arrangements of the aggregated and formatted A/V content information are possible. For example, groups of thumbnail images may be presented in columns rather than in rows. Alternatively, groups of thumbnail images may be presented as a three-dimensional grouping that may then be selected and expanded for browsing without departure from the scope of the present subject matter. Accordingly, all such alternatives are considered to be within the scope of the present subject matter.

Based upon the example user interface illustrated within FIG. 8, a user of the DLNA client 102 may browse the aggregated and formatted A/V content information as represented by the non-hierarchical pool of A/V identifier elements based upon the group designation or may browse between groups as desired. For ease of illustration purposes, detailed graphics associated with each of the thumbnail images are not illustrated. However, it is understood that a thumbnail image may include a graphical representation associated with the represented A/V content.

The aggregated and formatted A/V content information may include additional information, such as a category, a genre, a title, a runtime, a date or other information associated with the represented A/V content. As described above, this information may be used to filter the aggregated A/V content information. Additionally, to facilitate access to this additional information for A/V content selection for rendering, the example user interface of FIG. 8 provides a cursor 838 that allows the user to navigate among the thumbnail images 802-810, 814-822, and 826-834. As the user moves the cursor 838 over different thumbnail images, a focus event may be triggered in association with the example user interface and routed to the processor 200 by the input device 204. It should be noted that other user interface selection components may be provided in addition to or in place of the cursor 838. For example, a user interface may provide touch screen or touch pen capabilities that allow a user to navigate among the various thumbnail images 802-810, 814-822, and 826-834 without departure from the scope of the present subject matter.

As can be seen from FIG. 8, a focus indicator 840 highlights the thumbnail image 804 in response to the cursor 838 being placed over the thumbnail image 804. In response to the focus event, a status area 842 displays the title of the A/V content associated with the thumbnail image 804. In this example, text of the title is "Far From Here." A duration area 844 displays that the duration of the respective A/V content is two hours and four minutes (e.g., 2:04). Additionally, a video location indicator 846 shows that the focused thumbnail image 804 is associated with the second of forty nine available videos (e.g., 2/49). Accordingly, the example user interface of FIG. 8 displays information associated with the A/V content represented by a given thumbnail image in response to a focus event to provide the user with additional information for selection of A/V content for viewing.

Regarding selection of A/V content for rendering and viewing, as described above, the aggregated and formatted A/V content information may include a URI that forms a link to the respective A/V content represented by the respective thumbnail images 802-810, 814-822, and 826-834. The respective URI may be used to access the individual A/V content elements on the respective DLNA server_1 106 through DLNA server_N 110. Within the example user interface, the respective URI is associated with each of the thumbnail images 802-810, 814-822, and 826-834 so that when a user selects the respective thumbnail image, the link formed by the URI is activated to access the associated A/V content for rendering. The selected A/V content may then be rendered on the DLNA client 102 or another device chosen by the user.

A navigation field 848 provides the user of the DLNA client 102 with additional navigation options to retrieve or view more video selections. Additionally, a navigation field 850 provides the user of the DLNA client 102 with instructions for returning to an additional menuing structure (not shown) for additional navigation capabilities, such as selecting a device other than the DLNA client 102 for rendering of selected A/V content. Many other navigation fields are possible, such as fields for switching between video and audio content, and all are considered within the scope of the present subject matter.

Additionally, when more aggregated A/V content information in the form of thumbnail images or URIs within the non-hierarchical pool of A/V identifier elements is available for presentation to the user than the viewable area of the display device 202 may accommodate, a portion of the non-hierarchical pool of A/V identifier elements may be presented initially. In such a situation, scrolling, paging, or other navigational activities may be employed to traverse the remaining elements of the non-hierarchical pool of A/V identifier elements without departure from the scope of the present subject matter.

Accordingly, the present subject matter provides automated aggregation and filtering of A/V content information representing available A/V content located on multiple DLNA servers within a the home network 104. The DLNA client 102 automatically aggregates the A/V content information when it enters the network, when DLNA servers enter the network, and when A/V content changes within any DLNA server on the network. The DLNA client 102 filters the A/V content information in response to user queries for A/V content based upon A/V filter criteria, such as category, genre, title, runtime, date or other filtering criteria. The DLNA client presents a non-hierarchical pool of A/V identifier elements, such as thumbnail images or uniform resource identifiers (URIs), to a user. Each of the A/V identifier elements form a portion of and represent one item of filtered and aggregated A/V content information. As such, a user may select an A/V identifier element to access the associated A/V content for rendering without separately accessing or navigating a directory hierarchy for each DLNA server. Upon selection of the respective A/V identifier element, the associated URI is accessed to render the associated A/V content. The aggregated and filtered non-hierarchical pool of A/V identifier elements may be organized, categorized, and grouped in a variety of ways to facilitate increased A/V content navigational opportunities.

Bridge Between DLNA Protocol and Web Protocol for Aggregated A/V Content Information It should be understood that the present subject matter as described above is not limited to aggregation and filtering of A/V content information for access by nodes within a home network, such as the DLNA client 102 within the home network 104. The present subject matter applies as well to aggregation and filtering of A/V content information for access by web-based devices located either outside of the home network 104, such as the web-based rendering device 114, or that are incorporated into the DLNA client 102. Devices such as the web-based rendering device 114 may access the aggregation and filtering capabilities of the DLNA client 102 via a connection to the network 116. An example of a web-based protocol suitable for providing the described access is the transmission control protocol over Internet protocol (TCP/IP). Hypertext transfer protocol (HTTP) and extensible markup language (XML) formatting may be used for messaging over the TCP/IP connection to the network 116. Other web protocols exist and all are considered within the scope of the present subject matter.

Figure 9:
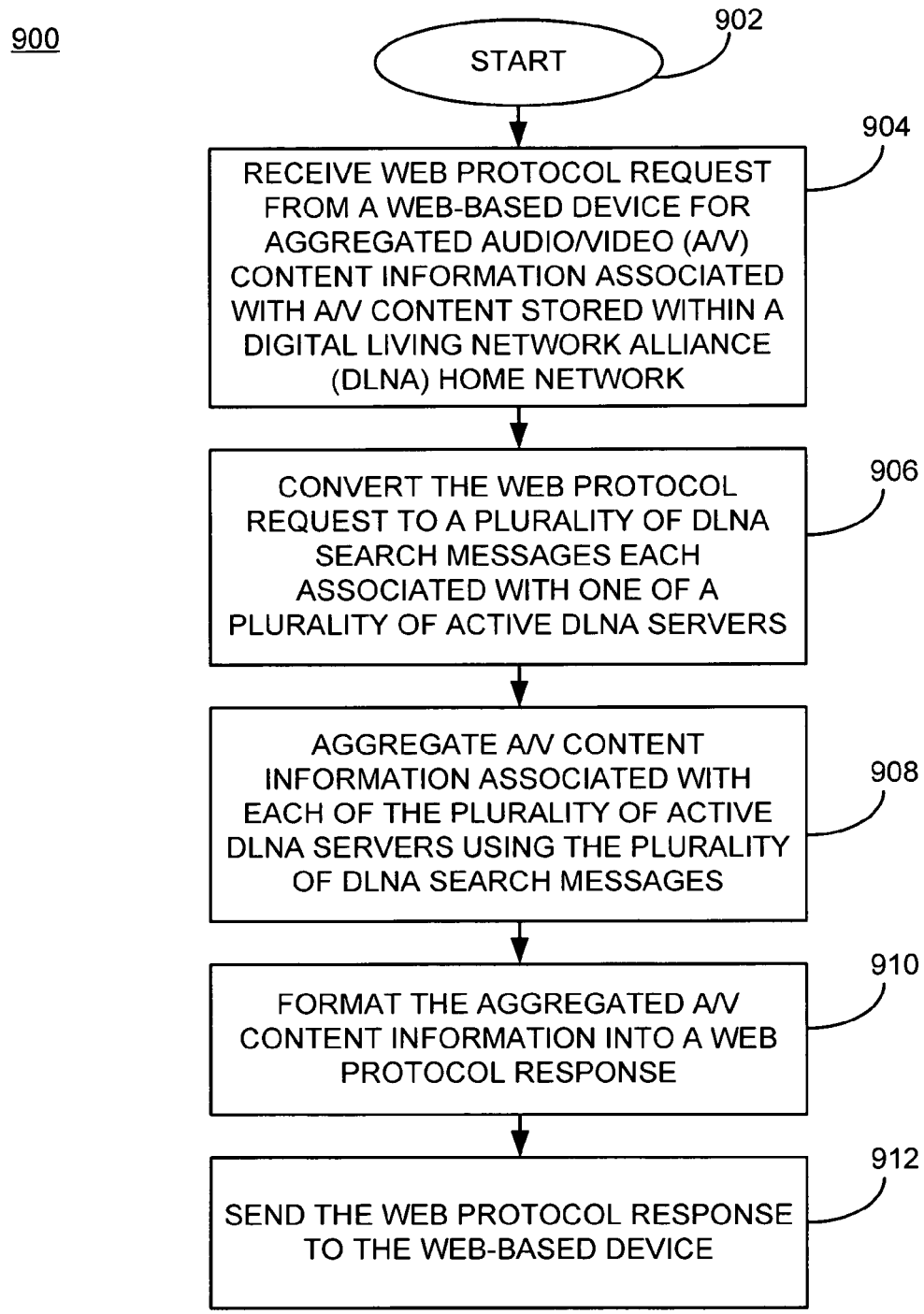
FIG. 9 is a flow chart of an example of an implementation of a process that provides bridging capabilities for providing automated aggregation and filtering of A/V content information to web-based devices located outside of a home network.

FIG. 9 is a flow chart of an example of an implementation of a process 900 that provides bridging capabilities for providing automated aggregation and filtering of A/V content information to web-based devices, such as the web-based rendering device 114, located outside of the home network 104. The process 900 may form a portion of the HTTP-DLNA bridge interface 216 and may also form a portion of the DLNA user interface application 214 described above. The process 900 starts at 902. At block 904, the process 900 receives a web protocol request from a web-based device for aggregated A/V content information associated with A/V content stored within the DLNA home network 104. At block 906, the process 900 converts the web protocol request to a plurality of DLNA search messages each associated with one of a plurality of active DLNA servers. At block 908, the process 900 aggregates A/V content information associated with each of the plurality of active DLNA servers using the plurality of DLNA search messages. At block 910, the process 900 formats the aggregated A/V content information into a web protocol response. At block 912, the process 900 sends the web protocol response to the web-based device.

Figure 10:
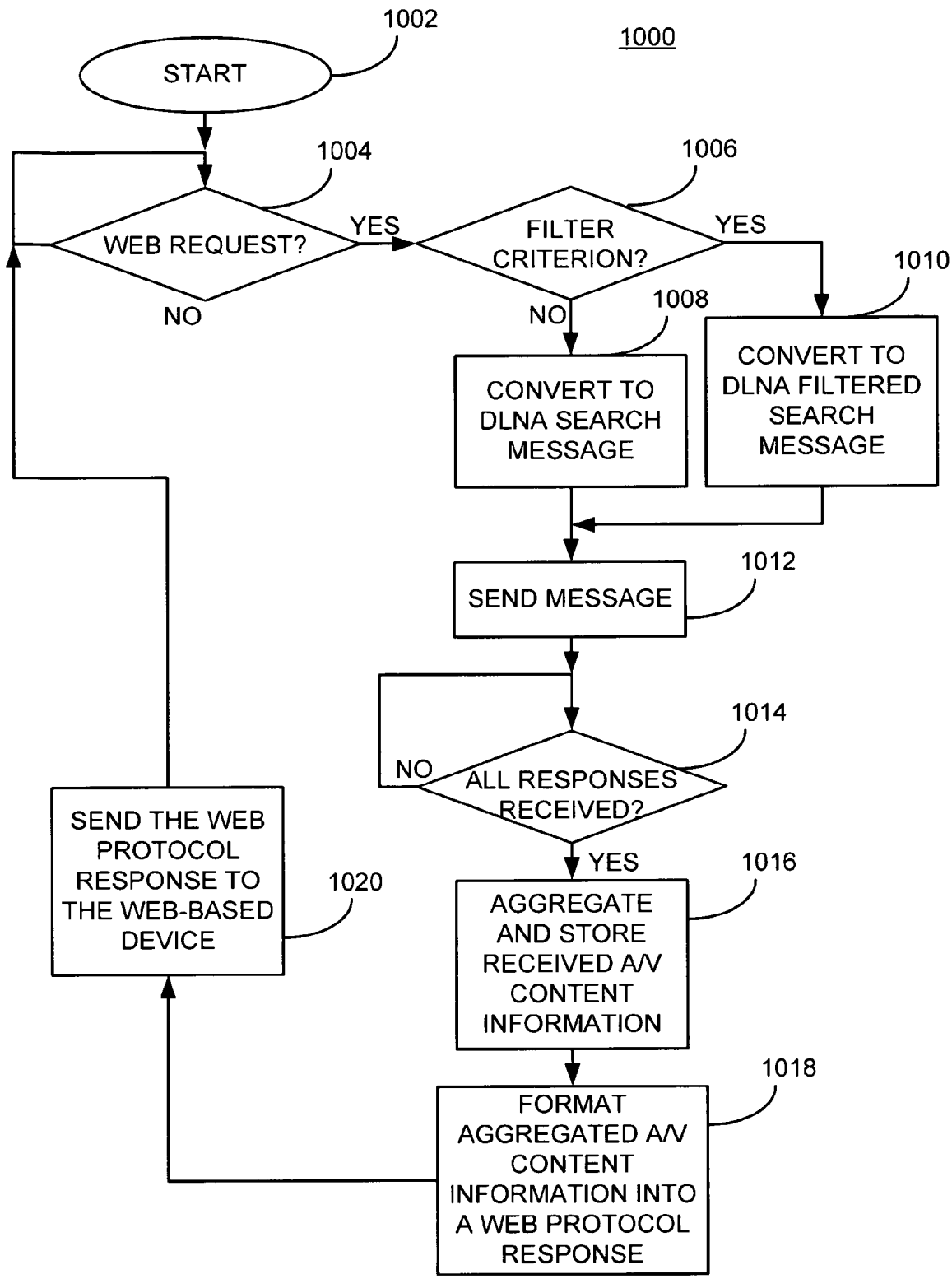
FIG. 10 is a flow chart of an example of an implementation of a process that provides additional detail associated with web protocol bridging for providing automated aggregation and filtering of A/V content information to web-based devices located outside of a home network.

FIG. 10 is a flow chart of an example of an implementation of a process 1000 that provides additional detail associated with web protocol bridging for providing automated aggregation and filtering of A/V content information to web-based devices, such as the web-based rendering device 114, located outside of the home network 104. The process 1000 starts at 1002. At decision point 1004, the process 1000 waits for a web protocol request from a web-based device for aggregated and/or filtered A/V content information stored within the home network 104. As described above and in more detail below, the request may be generated by a user of the web-based rendering device 114 or other web-based device and received at the DLNA client 102 via the HTTP-DLNA bridge interface 216.

For purposes of the present description, it is assumed that the DLNA client 102 maintains a list of active DLNA servers and that this list is updated either periodically or as DLNA servers enter and leave the home network 104. Accordingly, the DLNA client 102 may issue queries to any active DLNA server in response to receipt of a web protocol request for aggregated and/or filtered A/V content information stored within the home network 104.

An example web protocol request for filtered A/V content information associated with A/V content stored within the home network 104 is illustrated below. While many potential formats may be used, the example filtered web protocol request below represents an example of an HTTP-formatted request message that requests the return of A/V content information for fifty (50) video items beginning at index offset zero (0) sorted in ascending order based upon title. It should be noted that the offset may be adjusted during subsequent web protocol requests to allow a user at the requesting node to page through the returned results using sequential web protocol requests. The example web protocol request is identified as a "GetContentList" message and requests filtering of available A/V content information associated with a type of "video," a category of "movie," a genre of "western," and a rating of "PG-13."

--- http://192.168.22.11:8080/dlna_service/GetContentList/type=VIDEO&category=MOVIE&genre=WESTERN&sort_by=TITLE&offset=0&size=50& rating=PG-13

---

As can be seen from the example filtered web protocol request above, web-based devices, such as the web-based rendering device 114, located outside of the home network 104 may utilize a web protocol message format, such as HTTP, to request A/V content information for A/V content located within the home network 104. An IP address of "192.168.22.11" is used within the HTTP message to address the DLNA client 102. However, as described above, for implementations where the web-based rendering device 114 forms a portion of the DLNA client 102, a reserved IP address of "127.0.0.1" or other reserved IP address may be used for internal communications between the web-based rendering device 114 and other components within the DLNA client 102, such as the processor 200.

Furthermore, as described above, as a user completes review of the returned A/V content information, a next group of A/V content information may be requested, such as A/V content information for the next fifty (50) video items stored beginning at index fifty one (51) (e.g., video items indexed from 51 through 100), to allow the user to page through the aggregated and/or filtered A/V content information. By reducing the amount of A/V content information requested, storage capacity may be reduced at the DLNA client 102. Additionally, search bandwidth requirements may be reduced by distributing A/V content searches over time.

Returning to the example of FIG. 10, upon receipt of a web protocol request for aggregated and/or filtered A/V content at decision point 1004, the process 1000 makes a determination at decision point 1006 as to whether at least one filter criterion is associated with the query request. As described above, a filter criterion may include a criterion such as content type, genre, title, runtime, date of production, or other type of filtering criterion that may be used to filter and categorize available A/V content within the home network 104. When a determination is made that the query request does not include at least one filter criterion, the process 1000 converts the web protocol request to a DLNA search message at block 1008. The DLNA search message may be formatted similarly to those described above in association with FIG. 4, and as described in detail in the above-referenced DLNA specifications which are incorporated by reference. As such, a detailed description of the DLNA message formats will not be described within this section.

When a determination is made that the query request does include at least one filter criterion, at block 1010 the process 1000 converts the web protocol request to a DLNA filtered search message having a format similar to that described above in association with FIG. 4. At block 1012, the process 1000 sends either the DLNA search message or the DLNA filtered search message to one or more DLNA servers, such as the DLNA server_1 106 through the DLNA server_N 110, within the home network 104.

In either situation, the process 1000 waits at decision point 1014 for all responses to be received. It should be noted that time out procedures and other error control procedures are not illustrated within the example process 1000 for ease of illustration purposes. However, it is understood that all such procedures are considered to be within the scope of the present subject matter for the example process 1000 or any other process described herein.

Within the present example, the responses received include A/V content information in the form of the URIs described above that form hyperlinks to the storage location of the referenced A/V content. Additionally, the A/V content information may include thumbnail images and other information, such as a category, genre, title, runtime, date, and server identifier without departure from the scope of the present subject matter.

Continuing with the present example, when the URIs are received, the URIs may be used to retrieve thumbnail images and other A/V content information. Accordingly, when a determination is made at decision point 1014 that all anticipated responses have been received, the process 1000 aggregates and stores the received A/V content information at block 1016. It should be noted that while the present example illustrates receipt of URIs without separate processing to retrieve additional A/V content information prior to aggregating the received information, the aggregation and storage at block 1016 may be performed on the received URIs with or without receipt of additional A/V content information without departure from the scope of the present subject matter. Furthermore, when additional A/V content information is received after aggregation of the URIs, any received A/V content information may then be aggregated with the previously aggregated URIs.

The process 1000 formats the aggregated and/or filtered A/V content information into a web protocol response to the received web protocol request at block 1018. The web protocol response may be in the form of a markup language (ML) response. For example, the following pseudo XML-formatted response message may be used to formulate a web protocol response suitable for communicating the aggregated and/or filtered A/V content information to a requesting web-based device, such as the web-based rendering device 114, located outside of the home network 104.

```
<?xml version="1.0" encoding="UTF-8" ?>
<response>
  <header version="01">
    <command>GetContentList</command>
    <code>0</code>
  </header>
  <list_header version="01">
    <type>video</type>
    <num_items>200<num_items>
  </list_header>
```

```
<content_list>
  <item id="0">
    <title>S1 - Dust_to_Glory_1</title>
    <description> This is detailed description</description>
    <date>2004-01-29</date>
    <icon>http://10.22.1.182:10243/WMPNSSv3/3114068672/
       0_ezI0NkQzRjJBLTJMC.jpg?albumArt=true</ icon>
    <source>http://10.22.1.182:10243/WMPNSSv3/3114068672/
       1_ezI0NkQzRjJBLTJEFRkI5OX0uMC44.wmv</source>
    <type>video</type>
    <rating>PG-13</rating>
    <duration>5:07</duration>
  </item>
    ...
  <item id="49">
    <title> S1 - Dust_to_Glory_49</title>
    <description> This is detailed description</description>
    <date>2004-01-29</date>
    <icon>http://10.22.1.182:10243/WMPNSSv3/3114068672/
       0_ezI0NkQzRjJBLTJMC49.jpg?albumArt=true</ icon>
    <source>http://10.22.1.182:10243/WMPNSSv3/3114068672/
       1_ezI0NkQzRjJBLTJEFRkI5OX0uMC49.wmv</source>
    <type>video</type>
    <rating>PG-13</rating>
    <duration>7:07</duration>
  </item>
  </content_list>
</response>
```

As can be seen from this example XML-formatted response message, an XML-formatted tag pair "response" and "/response" outline the response message content. A "header" tag pair identifies this example XML-formatted response message as a response to a "GetContentList" message previously received and described above. A "code" tag pair identifies an error code for the example XML-formatted response message. In the present example, an error code of zero (0) is shown. This zero error code may be used to indicate that there was no error with the previous request. An example of such a no-error condition occurs when the request size is less than or equal to the number of available A/V content items within the home network 104, as described in more detail below in association with the "num_items" tag pair. An example error condition may be indicated with any value other than the chosen no-error condition identifier, such as one hundred (100). Such an error condition may be indicated when the requested offset is greater than the available A/V content items within the home network 104. It is understood that any value may be used to indicate an error condition or a non-error condition without departure from the scope of the present subject matter.

A "list_header" tag pair includes two additional tag pairs, "type" and "num_items." The "type" tag pair may indicate the type of A/V content listed within the XML-formatted response message. Example identifiers usable within the "type" tag pair are video, music, etc. Within the present example, video A/V content information is being returned. The number of available A/V content items that match the search criteria within the home network 104 may be communicated via the tag pair "num_items." Within the present example two hundred (200) video items are available. As such, based upon the web protocol request described above with a requested size of fifty, two hundred items are available and a no-error condition zero is returned within the XML-formatted response message. For circumstances where fewer than the requested number of items are available, the "num_items" field may be used to indicate that fewer items are available than requested and that the number of available items has been returned. Such a situation may be considered a non-error situation and an error code of zero may be returned.

A "content list" tag pair delimits the payload for the XML-formatted response message. "Item" tag pairs identify each item of A/V content information and include an item index for reference. The present example only shows the first and last item in a list of fifty returned items indexed from zero (0) to forty nine (49) for ease of illustration purposes. However, it is understood that an actual message would include all of the returned items. Each item within the list includes tag pairs for identifying the title, description, icon identifier (e.g., a URI to the thumbnail image), source identifier (e.g., URI to actual content), a type (e.g., video, music, etc.), a rating, and a duration. Within the present example, a rating of "PG-13" is illustrated for each returned item in response to the web protocol request for PG-13 content described above.

Returning to the description of FIG. 10, the process 1000 may utilize a markup language format, such as the example described above, to format aggregated A/V content into a web protocol response to a web protocol request at block 1018. At block 1020, the process 1000 sends the web protocol response to the web-based device, such as the web-based rendering device 114, located outside of the home network 104 and returns to decision point 1004 to await another web protocol request from a web-based device for aggregated and/or filtered A/V content information stored within the home network 104.

Accordingly, the process 1000 provides filtering and aggregation of A/V content information in response to web protocol requests and returns search results in a web protocol format to a web-based device located outside of the home network 104, while also reducing memory storage requirements for the filtered and aggregated A/V content information and reducing communication bandwidth.

Figure 11A:
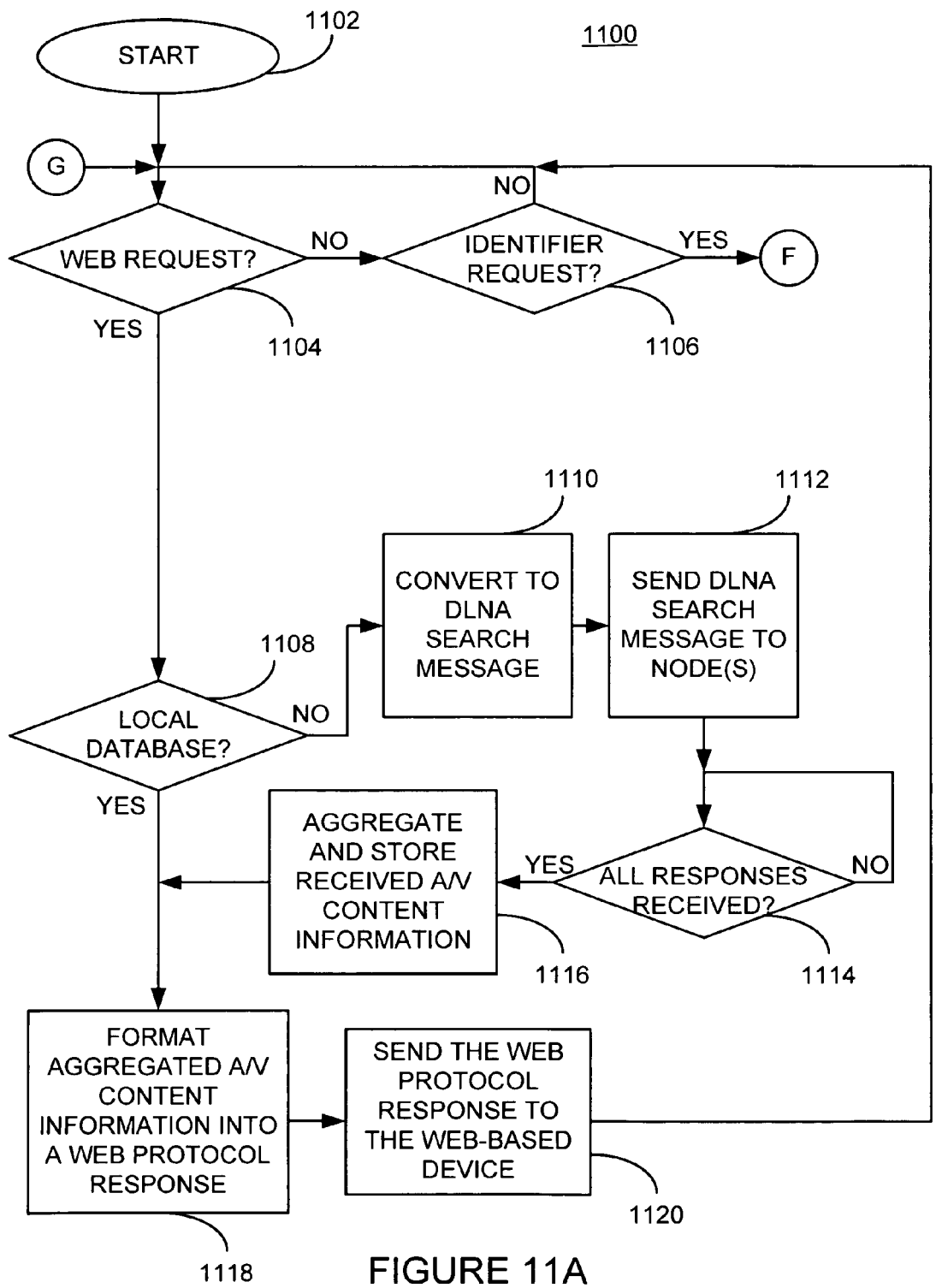
FIG. 11A is a flow chart of an example of an implementation of a first portion of a process that provides additional detail associated with operations for aggregation and filtering of A/V content information in response to web protocol queries and identifier requests for A/V content.
Figure 11B:
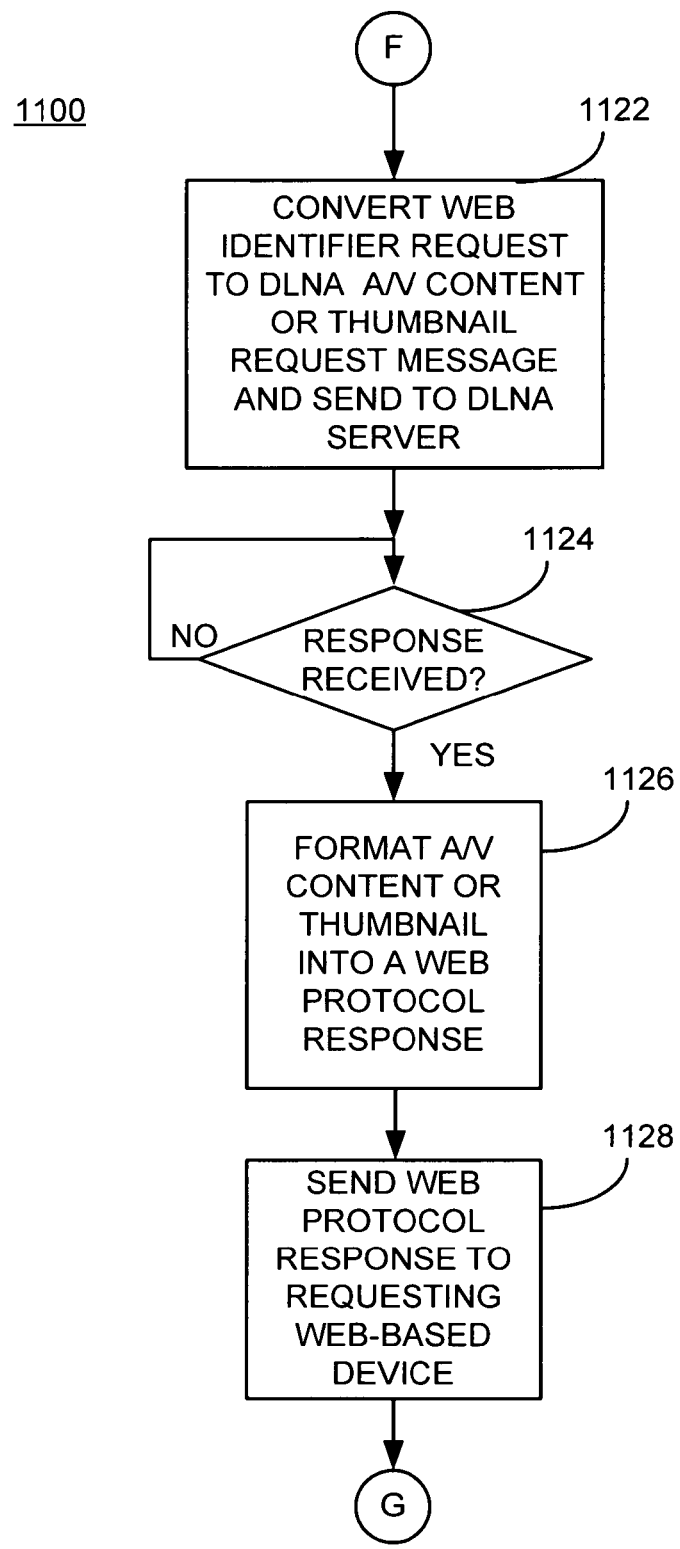
FIG. 11B is a flow chart of an example of an implementation of a second portion of a process that provides additional detail associated with operations for aggregation and filtering of A/V content information in response to web protocol queries and identifier requests for A/V content.

FIGS. 11A-11B illustrate a flow chart of an example of an implementation of a process 1100 that provides additional detail associated with operations for aggregation and filtering of A/V content information in response to web protocol queries and identifier requests for A/V content. The process 1100 starts within FIG. 11A at 1102. At decision point 1104, the process 1100 waits for a web protocol request from a web-based device for aggregated A/V content information. It should be noted that the example process 1100 does not detail filtering operations for ease of illustration purposes. However, filtering may be implemented as described above without departure from the scope of the present subject matter. As described above and in more detail below, the request may be generated by a user of the web-based rendering device 114 or other web-based device and received at the DLNA client 102 via the HTTP-DLNA bridge interface 216.

When a determination is made at decision point 1104 that a web protocol request has not been received, the process 1100 makes a determination at decision point 1106 as to whether a web protocol identifier request has been received. A web protocol identifier request may include an HTTP GET CONTENT command to allow the process 1100 to act as a proxy for the requesting device. An example HTTP GET CONTENT message is shown below.
http://192.168.11.22:8080/GetContent/?WMPNSSv3/
3114068672/1_ez10NkQzRjJBL
TJEFRk15OX0uMC44.wmv As can be seen from this example of an HTTP GET CONTENT message, "192.168.11.22" is the IP address of the DLNA client 102 and the URI of the first returned item in the XML-formatted response message example above is being requested (e.g., the item with item id="0"). Accordingly, the process 1100 may identify HTTP GET CONTENT messages or other message types of web protocol identifier requests that are received. Many types of web protocol identifier requests are possible and all are considered within the scope of the present subject matter.

Returning to the description of FIG. 11A, when a determination is made at decision point 1106 that a web protocol identifier request has not been received, the process 1100 returns to decision point 1104 and iterates as described above. When a determination is made at decision point 1104 that a web protocol request has been received, the process 1100 makes a determination as to whether a local database of aggregated A/V content information has been previously built at decision point 1108. As described above in association with FIG. 5A, a local database may be built to provide more rapid responses to A/V content query requests from a user for renderable A/V content. When a determination is made that a local database of aggregated A/V content information has not been previously built, the process 1100 converts the web protocol request to a DLNA search message at block 1110. At block 1112, the process 1100 sends the DLNA search message to one or more DLNA servers, such as the DLNA server_1 106 through the DLNA server_N 110. At decision point 1114, the process 1100 waits for all anticipated responses to be received.

When all anticipated responses have been received, the process 1100 aggregates and stores the received A/V content information at block 1116. This aggregated A/V content information may be used to form or begin formation of a local A/V content database, depending upon whether all available A/V content information has been requested from all DLNA servers or whether only a portion has been requested, respectively.

When the aggregated A/V content information has been stored at block 1116 or when a determination is made at decision point 1108 that a local aggregated A/V content database has already been built, the process 1100 formats the aggregated A/V content information into a web protocol response, such as the XML-formatted response message described above, at block 1118 as described above. At block 1120, the process 1100 sends the web protocol response to the requesting web-based device and returns to decision point 1104 and iterates as described above.

Returning to the description of decision point 1106, when a determination is made that a web protocol identifier request has been received, processing continues as illustrated within FIG. 11B. For purposes of the present description, an example web protocol identifier request includes a URI association with requested A/V content or a URI associated with a requested thumbnail image. As such, the URI may be used to retrieve the requested A/V content or thumbnail image. At block 1122, the process 1100 converts the web protocol identifier request into a DLNA A/V content or thumbnail image request message including the associated URI and sends the DLNA message to the respective DLNA server associated with the requested A/V content or thumbnail image. To correlate the storage location of the respective A/V content or thumbnail image with requests based upon previously generated content lists, the DLNA client 102 maintains associations between the A/V content or thumbnail images and the DLNA server that stores the respective A/V content or thumbnail images within the aggregated A/V content information database 112 and uses these associations to perform message conversion and content processing.

As with the incoming web protocol identifier request, HTTP formatting may be used to retrieve the requested A/V content or thumbnail image from the respective DLNA server. An example HTTP GET message that may be generated by the DLNA client 102 including the URI for a thumbnail image or A/V content is shown below.

---
GET http://10.22.1.182:10243/WMPNSSv3/3114068672/
1_ezI0NkQzRjJBLTJEFRkI5OX0uMC44.wmv
HTTP 1.0

---

As can be seen from this example of an HTTP GET message, "10.22.1.182" is the IP address of the respective DLNA servers and is the same IP address identified in the first returned item in the XML-formatted response message example above is being requested (e.g., the item with item id="0"). Accordingly, the process 1100 may convert incoming web protocol identifier requests to requests for content and forward those requests to storage devices within the home network 104.

The process 1100 waits at decision point 1124 for the response from the respective DLNA server. When then response is received, the process 1100 formats the A/V content or thumbnail image to a web protocol response at block 1126. The web protocol response may be similar to the example described above in association with FIG. 10 wherein this example the payload of the web protocol message is the actual A/V content or thumbnail image. At block 1128, the process 1100 sends the web protocol response to the requesting web-based device and returns to decision point 1104 in FIG. 11A to iterate as described above.

Accordingly, the process 1100 provides aggregation of A/V content information in response to web protocol requests and returns search results in a web protocol format to the requesting web-based device. The process 1100 also responds to web protocol requests including URIs associated with specific A/V content or thumbnail images and returns the requested items to the requesting web-based device using a web protocol response format. As described above, the example process 1100 does not detail filtering operations for ease of illustration purposes. However, filtering may be implemented as described above without departure from the scope of the present subject matter.

It should be understood that when the web-based rendering device 114 is incorporated into and/or a part of the DLNA client 102, the web-based rendering device 114 may utilize the returned content list to select an item of A/V content or a thumbnail image for rendering. In such a situation, the web-based rendering device 114 may send a web protocol identifier request, such as the example HTTP GET message described above, directly to the respective DLNA server, such as the DLNA server_1 106 through the DLNA server_N 110, for the selected item of A/V content or the associated thumbnail image using the respective URI.

Accordingly, the present subject matter provides automated aggregation and filtering of A/V content information representing available A/V content located on multiple DLNA servers within a the home network 104. The DLNA client 102 automatically aggregates the A/V content information when it enters the network, when DLNA servers enter the network, and when A/V content changes within any DLNA server on the network. The DLNA client 102 filters the A/V content information in response to user queries for A/V content based upon A/V filter criteria, such as category, genre, title, runtime, date or other filtering criteria. The DLNA client presents a non-hierarchical pool of A/V identifier elements, such as thumbnail images or uniform resource identifiers (URIs), to a user. Each of the A/V identifier elements form a portion of and represent one item of filtered and aggregated A/V content information. As such, a user may select an A/V identifier element to access the associated A/V content for rendering without separately accessing or navigating a directory hierarchy for each DLNA server. Upon selection of the respective A/V identifier element, the associated URI is accessed to render the associated A/V content. The aggregated and filtered non-hierarchical pool of A/V identifier elements may be organized, categorized, and grouped in a variety of ways to facilitate increased A/V content navigational opportunities. Furthermore, a bridge component provides translation between web protocols and the DLNA protocol to allow web-based applications outside of the home network to access the aggregated A/V content information for filtering and rendering via the web-based applications.

So, in accord with the above description, a web protocol request for A/V content information is received from a web-based device located outside of a home network. The web protocol request is converted to a plurality of DLNA search messages each associated with one of a plurality of active DLNA servers. A/V content information associated with each of the plurality of active DLNA servers is aggregated using the plurality of DLNA search messages. The aggregated A/V content information is formatted into a web protocol response. The web protocol response is sent to the web-based device.

Thus, in accord with certain implementations, a method of Digital Living Network Alliance (DLNA) audio and video (A/V) content aggregation and presentation to web-based devices outside of a DLNA home network involves receiving a web protocol request from a web-based device for aggregated A/V content information associated with A/V content stored within the DLNA home network; converting the web protocol request to a plurality of DLNA search messages each associated with one of a plurality of active DLNA servers; aggregating A/V content information associated with each of the plurality of active DLNA servers using the plurality of DLNA search messages; formatting the aggregated A/V content information into a web protocol response; and sending the web protocol response to the web-based device.

In certain implementations, the method of Digital Living Network Alliance (DLNA) audio and video (A/V) content aggregation and presentation to web-based devices outside of a DLNA home network the aggregating further involves sending the associated DLNA search message to each of the plurality of active DLNA servers. In certain implementations, the aggregating further involves receiving a DLNA response message from each of the plurality of active DLNA servers, each including the A/V content information associated with the respective active DLNA server. In certain implementations, the aggregating further involves combining the A/V content information received from each of the plurality of active DLNA servers into a non-hierarchical pool of A/V content identifier elements that each represent one item of the aggregated A/V content information. In certain implementations, the received web protocol request further includes at least one A/V filter criterion and the sending further involves sending at least a portion of the non-hierarchical pool of A/V identifier elements to the web-based device based upon the at least one A/V filter criterion. In certain implementations, each element of the non-hierarchical pool of A/V identifier elements further includes at least one of a thumbnail image, a uniform resource identifier (URI), a content type, a title, a runtime, a genre, and a date associated with each item of A/V content stored at each of the plurality of DLNA servers. In certain implementations, the method further involves receiving a web protocol request for an item of A/V content including a URI selected from the non-hierarchical pool of A/V identifier elements from the web-based device; retrieving at least one of a thumbnail image and A/V content associated with the selected URI from storage at the respective active DLNA server; formatting the at least one of the thumbnail image and the A/V content into a web protocol compatible format; and sending the at least one of the thumbnail image and the A/V content to the web-based device using the web protocol compatible format. In certain implementations, the received web protocol request further includes at least one A/V filter criterion and the aggregating further involves filtering the A/V content information associated with each of the plurality of active DLNA servers based upon the at least one A/V filter criterion. In certain implementations, the at least one A/V filter criterion further includes at least one of a content type, a genre, and a date of production, and the filtering further includes categorizing the aggregated A/V content information based upon the at least one of the content type, the genre, and the date of production. In certain implementations, the aggregating further involves sending a DLNA filtered search message including the at least one A/V filter criterion to each of the plurality of active DLNA servers. In certain implementations, the aggregating further involves receiving A/V search results in response to the DLNA filtered search message from each of the plurality of active DLNA servers and combining the A/V search results received from each of the plurality of active DLNA servers to form the aggregated A/V content information. In certain implementations, the method further involves querying at least one of the plurality of active DLNA servers for updated A/V content information in response to an indication of changed A/V content associated with the at least one of the plurality of active DLNA servers; receiving the updated A/V content information from the at least one of the plurality of active DLNA servers; formatting the updated A/V content information into a web protocol update message; and sending the web protocol update message to the web-based device. In certain implementations, the method further involves querying an activated DLNA server for A/V content information associated with the activated DLNA server in response to the activated DLNA server entering the home network; receiving the A/V content information associated with the activated DLNA server; aggregating the A/V content information associated with the activated DLNA server with the A/V content information received from the plurality of active DLNA servers; formatting the A/V content information associated with the activated DLNA server into a web protocol update message; and sending the web protocol update message to the web-based device. In certain implementations, the aggregating further involves aggregating the A/V content information at a DLNA client device.

A Digital Living Network Alliance (DLNA) audio and video (A/V) content aggregation device consistent with certain implementations has a memory adapted to store representations of A/V content distributed within a home network environment. A processor is programmed to receive a web protocol request from a web-based device for aggregated A/V content information associated with A/V content stored within the DLNA home network; convert the web protocol request to a plurality of DLNA search messages each associated with one of a plurality of active DLNA servers; aggregate A/V content information associated with each of the plurality of active DLNA servers using the plurality of DLNA search messages; store the aggregated A/V content information to the memory; format the aggregated A/V content information into a web protocol response; and send the web protocol response to the web-based device.

In certain implementations, the processor is further programmed to send the associated DLNA search message to each of the plurality of active DLNA servers. In certain implementations, the processor is further programmed to receive a DLNA response message from each of the plurality of active DLNA servers, each including the A/V content information associated with the respective active DLNA server. In certain implementations, the processor is further programmed to combine the A/V content information received from each of the plurality of active DLNA servers into a non-hierarchical pool of A/V content identifier elements that each represent one item of the aggregated A/V content information. In certain implementations, the received web protocol request further includes at least one A/V filter criterion and the processor is further programmed to send at least a portion of the non-hierarchical pool of A/V identifier elements to the web-based device based upon the at least one A/V filter criterion. In certain implementations, each element of the non-hierarchical pool of A/V identifier elements further includes at least one of a thumbnail image, a uniform resource identifier (URI), a content type, a title, a runtime, a genre, and a date associated with each item of A/V content stored at each of the plurality of DLNA servers. In certain implementations, the processor is further programmed to receive a web protocol request for an item of A/V content including a URI selected from the non-hierarchical pool of A/V identifier elements from the web-based device; retrieve at least one of a thumbnail image and A/V content associated with the selected URI from storage at the respective active DLNA server; format the at least one of the thumbnail image and the A/V content into a web protocol compatible format; and send the at least one of the thumbnail image and the A/V content to the web-based device using the web protocol compatible format. In certain implementations, the received web protocol request further includes at least one A/V filter criterion and the processor is further programmed to filter the A/V content information associated with each of the plurality of active DLNA servers based upon the at least one A/V filter criterion. In certain implementations, the at least one A/V filter criterion further includes at least one of a content type, a genre, and a date of production, and the processor is further programmed to categorize the aggregated A/V content information based upon the at least one of the content type, the genre, and the date of production. In certain implementations, the processor is further programmed to send a DLNA filtered search message including the at least one A/V filter criterion to each of the plurality of active DLNA servers. In certain implementations, the processor is further programmed to receive A/V search results in response to the DLNA filtered search message from each of the plurality of active DLNA servers and combine the A/V search results received from each of the plurality of active DLNA servers to form the aggregated A/V content information. In certain implementations, the processor is further programmed to query at least one of the plurality of active DLNA servers for updated A/V content information in response to an indication of changed A/V content associated with the at least one of the plurality of active DLNA servers; receive the updated A/V content information from the at least one of the plurality of active DLNA servers; format the updated A/V content information into a web protocol update message; and send the web protocol update message to the web-based device. In certain implementations, the processor is further programmed to query an activated DLNA server for A/V content information associated with the activated DLNA server in response to the activated DLNA server entering the home network; receive the A/V content information associated with the activated DLNA server; aggregate the A/V content information associated with the activated DLNA server with the A/V content information received from the plurality of active DLNA servers; format the A/V content information associated with the activated DLNA server into a web protocol update message; and send the web protocol update message to the web-based device. In certain implementations, the processor comprises a portion of a DLNA client device.

A Digital Living Network Alliance (DLNA) audio and video (A/V) content aggregation device consistent with certain implementations has a memory adapted to store representations of A/V content distributed within a home network environment. A processor is programmed to receive a web protocol request from a web-based device for aggregated A/V content information associated with A/V content stored within the DLNA home network; convert the web protocol request to a plurality of DLNA search messages each associated with one of a plurality of active DLNA servers; send the associated DLNA search message to each of the plurality of active DLNA servers; receive a DLNA response message from each of the plurality of active DLNA servers, each including the A/V content information associated with the respective active DLNA server; aggregate the received A/V content information associated with each of the plurality of active DLNA servers using the plurality of DLNA search messages to form a non-hierarchical pool of A/V content identifier elements that each represent one item of the aggregated A/V content information; store the aggregated A/V content information to the memory; filter the aggregated A/V content information based upon at least one A/V filter criterion associated with the web protocol request; format the filtered A/V content information into a web protocol response including at least a portion of the non-hierarchical pool of A/V identifier elements; and send the web protocol response to the web-based device.

While certain embodiments herein were described in conjunction with specific circuitry that carries out the functions described, other embodiments are contemplated in which the circuit functions are carried out using equivalent executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware, dedicated processors or combinations thereof.

Certain embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface processing and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of Digital Living Network Alliance (DLNA) audio and video (A/V) content aggregation and presentation to web-based devices outside of a DLNA home network, comprising:
   receiving a web protocol request from a web-based device for aggregated A/V content information that represents A/V content stored within the DLNA home network, where the received web protocol request further comprises at least one A/V filter criterion;
   sending a plurality of DLNA messages each associated with one of a plurality of active DLNA servers to each of the plurality respective plurality of active DLNA servers;
   at a DLNA client device, aggregating A/V content information that represents the A/V content stored within each of the plurality of active DLNA servers using the plurality of DLNA messages, where aggregating the A/V content information further comprises sending the associated DLNA message to each of the plurality of active DLNA servers and receiving a DLNA response message from each of the plurality of active DLNA servers, each comprising all of the A/V content information that represents all of the A/V content stored within the respective active DLNA server, where aggregating the A/V content information further comprises combining the A/V content information received from each of the plurality of active DLNA servers into a non-hierarchical pool of A/V content identifier elements that each represent one item of the aggregated A/V content information;
   filtering the aggregated A/V content information according to the at least one A/V filter criterion to produce aggregated filtered A/V content information;
   formatting the aggregated filtered A/V content information into a web protocol response; and
   sending the web protocol response to the web-based device, where the web protocol response is filtered upon the at least one A/V filter criterion.

2. The method according to claim 1, where each element of the non-hierarchical pool of A/V identifier elements further comprises at least one of a thumbnail image, a uniform resource identifier (URI), a content type, a title, a runtime, a genre, and a date associated with each item of A/V content stored at each of the plurality of DLNA servers.

3. The method according to claim 2, further comprising:
   receiving a web protocol request for an item of A/V content including a URI selected from the non-hierarchical pool of A/V identifier elements from the web-based device;
   retrieving at least one of a thumbnail image and A/V content associated with the selected URI from storage at the respective active DLNA server;
   formatting the at least one of the thumbnail image and the A/V content into a web protocol compatible format; and
   sending the at least one of the thumbnail image and the A/V content to the web-based device using the web protocol compatible format.

4. The method according to claim 1, where the at least one A/V filter criterion further comprises at least one of a content type, a genre, and a date of production, and where filtering the received A/V content information based upon the at least one A/V filter criterion further comprises categorizing the aggregated A/V content information based upon the at least one of the content type, the genre, and the date of production.

5. The method according to claim 1, where aggregating the A/V content information that represents the A/V content stored within each of the plurality of active DLNA servers further comprises sending a DLNA filtered search message comprising the at least one A/V filter criterion to each of the plurality of active DLNA servers.

6. The method according to claim 5, where aggregating the A/V content information that represents the A/V content stored within each of the plurality of active DLNA servers further comprises receiving A/V search results in response to the DLNA filtered search message from each of the plurality of active DLNA servers and combining the A/V search results received from each of the plurality of active DLNA servers to form the aggregated A/V content information.

7. The method according to claim 1, further comprising:
querying at least one of the plurality of active DLNA servers for updated A/V content information in response to an indication of changed A/V content stored within the at least one of the plurality of active DLNA servers;
receiving the updated A/V content information from the at least one of the plurality of active DLNA servers;
formatting the updated A/V content information into a web protocol update message; and
sending the web protocol update message to the web-based device.

8. The method according to claim 1, further comprising:
querying an activated DLNA server for A/V content information that represents the A/V content stored within the activated DLNA server in response to the activated DLNA server entering the home network;
receiving the A/V content information that represents the A/V content stored within the activated DLNA server;
aggregating the A/V content information that represents the A/V content stored within the activated DLNA server with the A/V content information received from the plurality of active DLNA servers;
formatting the A/V content information that represents the A/V content stored within the activated DLNA server into a web protocol update message; and
sending the web protocol update message to the web-based device.

9. A Digital Living Network Alliance (DLNA) audio and video (A/V) content aggregation device forming part of a DLNA client, comprising:
a memory adapted to store information that represents A/V content distributed within a home network environment; and
a processor programmed to:
receive a web protocol request from a web-based device for aggregated A/V content information that represents A/V content stored within the DLNA home network, where the received web protocol request comprises at least one A/V filter criterion;
send a plurality of DLNA messages each associated with one of a plurality of active DLNA servers to each of the plurality respective plurality of active DLNA servers;
aggregate A/V content information that represents the A/V content stored within each of the plurality of active DLNA servers using the plurality of DLNA messages, where aggregating the A/V content information further comprises sending the associated DLNA message to each of the plurality of active DLNA servers and receiving a DLNA response message from each of the plurality of active DLNA servers, each comprising all of the A/V content information that represents all of the A/V content stored within the respective active DLNA server, where aggregating the A/V content information further comprises combining the A/V content information received from each of the plurality of active DLNA servers into a non-hierarchical pool of A/V content identifier elements that each represent one item of the aggregated A/V content information;
store the aggregated A/V content information to the memory;
filter the aggregated A/V content information according to the at least one A/V filter criterion to produce aggregated filtered A/V content information;
format the aggregated filtered A/V content information into a web protocol response; and
send the web protocol response to the web-based device, where the web protocol response is filtered upon the at least one A/V filter criterion.

10. The device according to claim 9, where the processor is further programmed to send at least a portion of the non-hierarchical pool of A/V identifier elements to the web-based device based upon the at least one A/V filter criterion.

11. The device according to claim 9, where each element of the non-hierarchical pool of A/V identifier elements further comprises at least one of a thumbnail image, a uniform resource identifier (URI), a content type, a title, a runtime, a genre, and a date associated with each item of A/V content stored at each of the plurality of DLNA servers.

12. The device according to claim 11, where the processor is further programmed to:
receive a web protocol request for an item of A/V content including a URI selected from the non-hierarchical pool of A/V identifier elements from the web-based device;
retrieve at least one of a thumbnail image and A/V content associated with the selected URI from storage at the respective active DLNA server;
format the at least one of the thumbnail image and the A/V content into a web protocol compatible format; and
send the at least one of the thumbnail image and the A/V content to the web-based device using the web protocol compatible format.

13. The device according to claim 9, where the at least one A/V filter criterion further comprises at least one of a content type, a genre, and a date of production, and the processor is further programmed to categorize the aggregated A/V content information based upon the at least one of the content type, the genre, and the date of production.

14. The device according to claim 9, where the processor is further programmed to send a DLNA filtered search message comprising the at least one A/V filter criterion to each of the plurality of active DLNA servers.

15. The device according to claim 14, where the processor is further programmed to receive A/V search results in response to the DLNA filtered search message from each of the plurality of active DLNA servers and combine the A/V search results received from each of the plurality of active DLNA servers to form the aggregated A/V content information.

16. The device according to claim 9, where the processor is further programmed to:
query at least one of the plurality of active DLNA servers for updated A/V content information in response to an indication of changed A/V content stored within the at least one of the plurality of active DLNA servers;

receive the updated A/V content information from the at least one of the plurality of active DLNA servers;

format the updated A/V content information into a web protocol update message; and send the web protocol update message to the web-based device.

17. The device according to claim 9, where the processor is further programmed to:

query an activated DLNA server for A/V content information that represents the A/V content stored within the activated DLNA server in response to the activated DLNA server entering the home network;

receive the A/V content information that represents the A/V content stored within the activated DLNA server;

aggregate the A/V content information that represents the A/V content stored within the activated DLNA server with the A/V content information received from the plurality of active DLNA servers;

format the A/V content information that represents the A/V content stored within the activated DLNA server into a web protocol update message; and send the web protocol update message to the web-based device.

18. A Digital Living Network Alliance (DLNA) audio and video (A/V) content aggregation device forming part of a DLNA client, comprising:

a memory adapted to store information that represents A/V content distributed within a home network environment; and a processor programmed to:

receive a web protocol request from a web-based device for aggregated A/V content information that represents A/V content stored within the DLNA home network;

send a plurality of DLNA messages each associated with one of a plurality of active DLNA servers to each of the plurality respective plurality of active DLNA servers;

receive a DLNA response message from each of the plurality of active DLNA servers, each including all of the A/V content information that represents A/V content stored within the respective active DLNA server;

aggregate the received A/V content information that represents all of the A/V content stored within each of the plurality of active DLNA servers using the plurality of DLNA messages to form a non-hierarchical pool of A/V content identifier elements that each represent one item of the aggregated A/V content information;

store the aggregated A/V content information to the memory;

filter the aggregated A/V content information based upon at least one A/V filter criterion associated with the web protocol request;

format the filtered A/V content information into a web protocol response including at least a portion of the non-hierarchical pool of A/V identifier elements; and send the web protocol response to the web-based device.

* * * * *

UNITED STATES PATENT AND TRADEMARK OFFICE
CERTIFICATE OF CORRECTION

PATENT NO. : 8,631,137 B2  Page 1 of 1
APPLICATION NO. : 12/215630
DATED : January 14, 2014
INVENTOR(S) : Ludovic Douillet et al.

It is certified that error appears in the above-identified patent and that said Letters Patent is hereby corrected as shown below:

On the Title page, the assignees should read as follows:

(73) Assignees: Sony Corporation, Tokyo (JP); Sony Electronics Inc., Park Ridge, NJ (US)

Signed and Sealed this
Eleventh Day of August, 2015

Michelle K. Lee
*Director of the United States Patent and Trademark Office*